US006775264B1

(12) United States Patent
Kurganov

(10) Patent No.: US 6,775,264 B1
(45) Date of Patent: *Aug. 10, 2004

(54) COMPUTER, INTERNET AND TELECOMMUNICATIONS BASED NETWORK

(75) Inventor: Alex Kurganov, Buffalo Grove, IL (US)

(73) Assignee: Webley Systems, Inc., Bannockburn, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/033,335

(22) Filed: Mar. 2, 1998

Related U.S. Application Data

(60) Provisional application No. 60/040,056, filed on Mar. 3, 1997.

(51) Int. Cl.[7] ............................................. H04L 12/66
(52) U.S. Cl. ..................... 370/352; 370/390; 370/392
(58) Field of Search ................................. 370/352, 353, 370/355, 356, 260, 354, 400, 401, 389, 390, 391, 392, 261; 379/900, 88.02, 88.07, 88.11, 88.12, 88.13, 88.16, 88.17, 905, 907; 704/231, 270, 275

(56) References Cited

U.S. PATENT DOCUMENTS

| | | | |
|---|---|---|---|
| 4,313,035 A | 1/1982 | Jordan et al. ................ 379/207 |
| 4,585,906 A | 4/1986 | Matthews et al. ........ 379/88.26 |
| 4,596,900 A | 6/1986 | Jackson .......................... 179/2 |
| 4,696,028 A | 9/1987 | Morganstein et al. ..... 379/88.24 |
| 4,757,525 A | 7/1988 | Matthews et al. ............ 379/89 |
| 4,761,807 A | 8/1988 | Matthews et al. ........ 379/88.26 |
| 4,776,016 A | 10/1988 | Hansen ......................... 381/42 |

(List continued on next page.)

FOREIGN PATENT DOCUMENTS

| | | |
|---|---|---|
| WO | 96 09710 | 3/1996 |
| WO | 98 23058 | 5/1998 |

OTHER PUBLICATIONS

"Wildfire Communications Inc. (A)," *Harvard Business School* (Mar. 21, 1996), Publication No. 9-386-305, 22 pages. Not supplied.
"WordPerfect: New Telephony Features Boost Office," *WordPerfect Office TECHBRIEF* (1994), Info-World Publishing Company, vol. 10, Issue 2, pp. 2-3.
Brochure from Bellcore Technology Licensing, "The Electronic Receptionist—A Knowledge-Based Approach to Personal Communications," (1994), pp. 1-8.
Ly, "Chatter A: A Conversational Telephone Agent," submitted to *Program in Media Arts and Sciences*, Massachusetts Institute of Technology, (1993), pp. 1-130.
Schmandt et al., "A Conversational Telephone Messaging System," *IEEE Transactions on Consumer Electronics* (1984), vol. CE-30, No. 3, pp. xxi-xxiv.

(List continued on next page.)

*Primary Examiner*—Dan Ton
*Assistant Examiner*—Inder Pal Mehra
(74) *Attorney, Agent, or Firm*—Jenkens & Gilchrist

(57) ABSTRACT

A method and apparatus for a computer and telecommunication network which can receive, send and manage information from or to a subscriber of the network, based on the subscriber's configuration. The network is made up of at least one cluster containing voice servers which allow for telephony, speech recognition, text-to-speech and conferencing functions, and is accessible by the subscriber through standard telephone connections or through internet connections. The network also utilizes a database and file server allowing the subscriber to maintain and manage certain contact lists and administrative information. A web server is also connected to the cluster thereby allowing access to all functions through internet connections.

28 Claims, 27 Drawing Sheets

U.S. PATENT DOCUMENTS

| | | | | |
|---|---|---|---|---|
| 4,809,328 | A | 2/1989 | Morganstein et al. | 379/211 |
| 4,837,798 | A | 6/1989 | Cohen et al. | 379/88 |
| 4,850,012 | A | 7/1989 | Mehta et al. | 379/157 |
| 4,873,719 | A | 10/1989 | Reese | 379/215 |
| 4,907,079 | A | 3/1990 | Turner et al. | |
| 4,922,526 | A | 5/1990 | Morganstein et al. | 379/157 |
| 4,933,966 | A | 6/1990 | Hird et al. | 379/132 |
| 4,935,958 | A | 6/1990 | Morganstein et al. | 379/372 |
| 4,953,204 | A | 8/1990 | Cuschleg, Jr. et al. | 379/266 |
| 4,955,047 | A | 9/1990 | Morganstein et al. | 379/112 |
| 4,972,462 | A | 11/1990 | Shibata | 379/88.13 |
| 4,975,941 | A | 12/1990 | Morganstein et al. | 379/88.23 |
| 4,994,926 | A | 2/1991 | Gordon et al. | 358/400 |
| 5,020,095 | A | 5/1991 | Morganstein et al. | 379/88.23 |
| 5,027,384 | A | 6/1991 | Morganstein | 379/88.23 |
| 5,086,385 | A | 2/1992 | Launey et al. | 364/188 |
| 5,099,509 | A | 3/1992 | Morganstein et al. | 379/84 |
| 5,109,405 | A | 4/1992 | Morganstein | 379/88.21 |
| 5,131,024 | A | 7/1992 | Pugh et al. | 379/88.24 |
| 5,146,452 | A | 9/1992 | Pekarske | 370/16 |
| 5,166,974 | A | 11/1992 | Morganstein et al. | 379/67.1 |
| 5,195,086 | A | 3/1993 | Baumgartner et al. | 370/264 |
| 5,233,600 | A | 8/1993 | Pekarske | 370/14 |
| 5,243,645 | A | 9/1993 | Bissell et al. | 379/211 |
| 5,249,219 | A | 9/1993 | Morganstein et al. | 379/84 |
| 5,263,084 | A | 11/1993 | Chaput et al. | 379/215 |
| 5,291,302 | A | 3/1994 | Gordon et al. | 358/400 |
| 5,303,298 | A | 4/1994 | Morganstein et al. | 379/88.23 |
| 5,309,504 | A | 5/1994 | Morganstein | 379/67.1 |
| 5,327,486 | A | 7/1994 | Wolff et al. | 379/93.23 |
| 5,327,529 | A | 7/1994 | Fults et al. | 395/155 |
| 5,329,578 | A | 7/1994 | Brennan et al. | 379/88.19 |
| 5,333,266 | A | 7/1994 | Boaz et al. | 709/206 |
| 5,347,574 | A | 9/1994 | Morganstein | 379/210 |
| 5,355,403 | A | 10/1994 | Richardson, Jr. et al. | 379/88.26 |
| 5,375,161 | A | 12/1994 | Fuller et al. | 455/417 |
| 5,384,771 | A | 1/1995 | Isidoro et al. | 370/254 |
| 5,404,234 | A | 4/1995 | Bloomfield | 358/400 |
| 5,408,526 | A | 4/1995 | McFarland et al. | 379/202 |
| 5,414,754 | A | 5/1995 | Pugh et al. | 379/88.23 |
| 5,436,963 | A | 7/1995 | Fitzpatrick et al. | 379/212 |
| 5,459,584 | A | 10/1995 | Gordon et al. | 358/434 |
| 5,463,684 | A | 10/1995 | Morduch et al. | 379/202 |
| 5,475,791 | A | 12/1995 | Schalk et al. | 395/2.42 |
| 5,497,373 | A | 3/1996 | Hulen et al. | 370/79 |
| 5,499,288 | A | 3/1996 | Hunt et al. | 379/88 |
| 5,517,558 | A | 5/1996 | Schalk | 379/88 |
| 5,555,100 | A | 9/1996 | Bloomfield et al. | 358/402 |
| 5,559,611 | A | 9/1996 | Bloomfield et al. | 358/407 |
| 5,566,236 | A | 10/1996 | MeLampy et al. | 379/201 |
| 5,603,031 | A | | 2/1997 | White et al. | 709/317 |
| 5,608,786 | A | * | 3/1997 | Gordon | 379/100 |
| 5,610,970 | A | | 3/1997 | Fuller et al. | 455/417 |
| 5,611,031 | A | | 3/1997 | Hertzfeld et al. | 345/433 |
| 5,652,789 | A | * | 7/1997 | Miner et al. | 379/201.01 |
| 5,659,597 | A | | 8/1997 | Bareis et al. | 455/563 |
| 5,666,401 | A | | 9/1997 | Morganstein et al. | 379/67.1 |
| 5,675,811 | A | | 10/1997 | Broedner et al. | 713/323 |
| 5,689,669 | A | | 11/1997 | Lynch et al. | 345/355 |
| 5,692,187 | A | | 11/1997 | Goldman et al. | 707/203 |
| 5,724,408 | A | | 3/1998 | Morganstein | 379/88.2 |
| 5,752,191 | A | | 5/1998 | Fuller et al. | 455/445 |
| 5,787,298 | A | | 7/1998 | Broedner et al. | 713/323 |
| 5,793,993 | A | | 8/1998 | Broedner et al. | 710/126 |
| 5,809,282 | A | | 9/1998 | Cooper et al. | 395/500 |
| 5,812,796 | A | | 9/1998 | Broedner et al. | 710/103 |
| 5,819,306 | A | | 10/1998 | Goldman et al. | 711/100 |
| 5,867,494 | A | | 2/1999 | Krishnaswamy et al. | 370/352 |
| 5,867,495 | A | | 2/1999 | Elliott et al. | 370/352 |
| 5,873,080 | A | | 2/1999 | Coden et al. | 707/3 |
| 5,884,262 | A | * | 3/1999 | Wise et al. | 704/270.01 |
| 5,890,123 | A | | 3/1999 | Brown et al. | 704/275 |
| 5,915,001 | A | | 6/1999 | Uppaluru | 379/88.22 |
| 5,974,413 | A | | 10/1999 | Beauregard et al. | 707/6 |
| 5,999,525 | A | | 12/1999 | Krishnaswamy et al. | 370/352 |
| 6,012,088 | A | * | 1/2000 | Li et al. | 709/219 |
| 6,014,437 | A | | 1/2000 | Acker et al. | 379/219 |
| 6,021,181 | A | | 2/2000 | Miner et al. | 379/201 |
| 6,031,904 | A | * | 2/2000 | An et al. | 379/201 |
| 6,047,053 | A | | 4/2000 | Miner et al. | 379/201 |
| 6,067,516 | A | * | 5/2000 | Levay et al. | 704/244 |
| 6,078,580 | A | * | 6/2000 | Mandalia et al. | 370/352 |
| 6,081,518 | A | | 6/2000 | Bowman-Amuah | 370/352 |
| 6,091,808 | A | * | 7/2000 | Wood et al. | 379/201 |
| 6,115,742 | A | | 9/2000 | Franklin et al. | 709/224 |
| 6,208,638 | B1 | | 3/2001 | Rieley et al. | 370/354 |
| 6,233,318 | B1 | | 5/2001 | Picard et al. | 379/88.17 |
| 6,252,944 | B1 | | 6/2001 | Hansen, II et al. | 379/67.1 |
| 6,285,745 | B1 | | 9/2001 | Bartholomew et al. | 379/88.17 |
| 6,477,420 | B1 | | 11/2002 | Lim et al. | 379/67.1 |

OTHER PUBLICATIONS

Schmandt et al., "Phone Slave: A Graphical Telecommunications Interface," Proceedings of the SID (1985), vol. 26/1, pp. 79–82.

Schmandt, "Phoneshell: the Telephone as Computer Terminal," Proceedings of ACM Multimedia '93 Conference (1993), pp. 373–382.

* cited by examiner

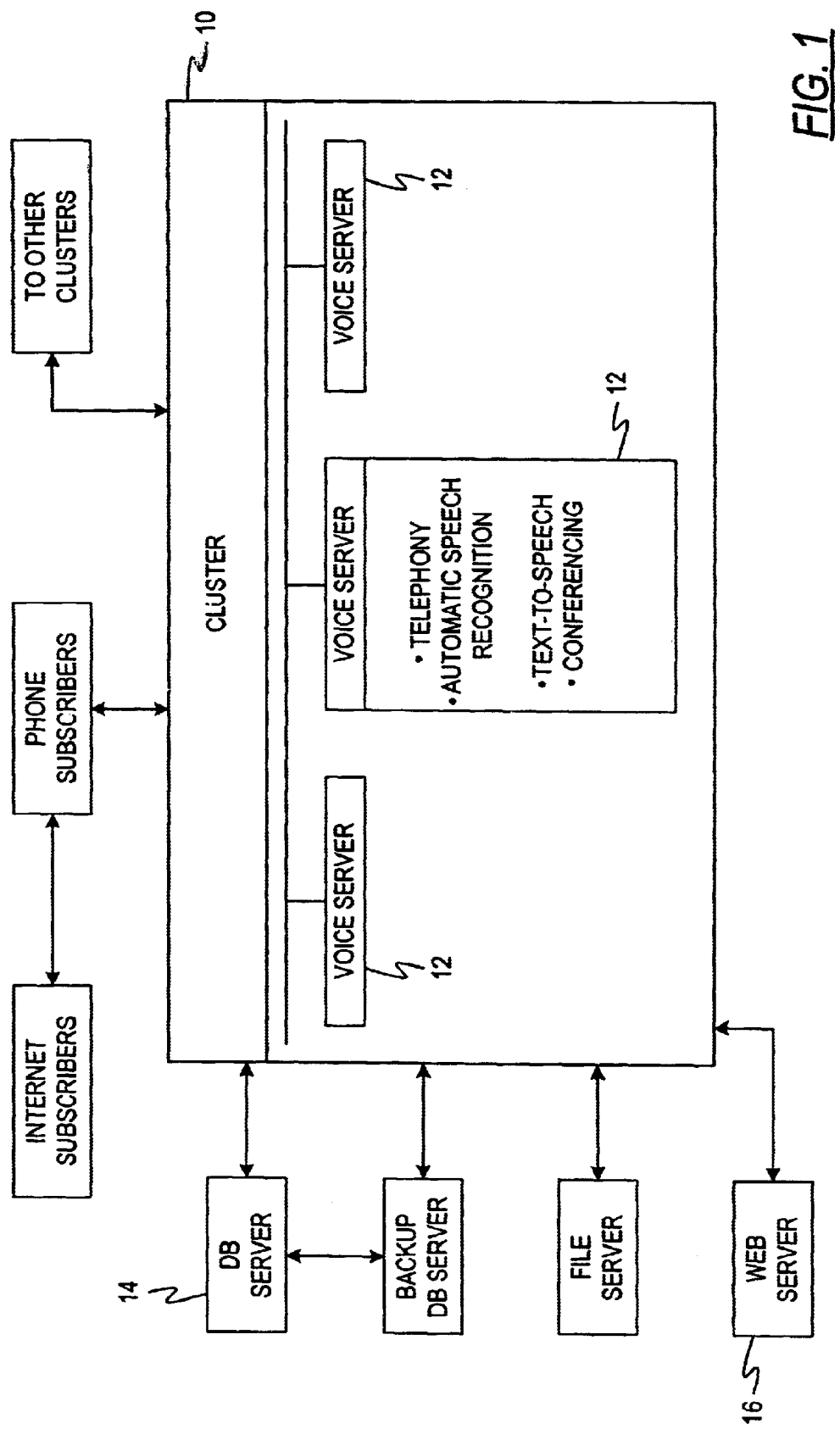

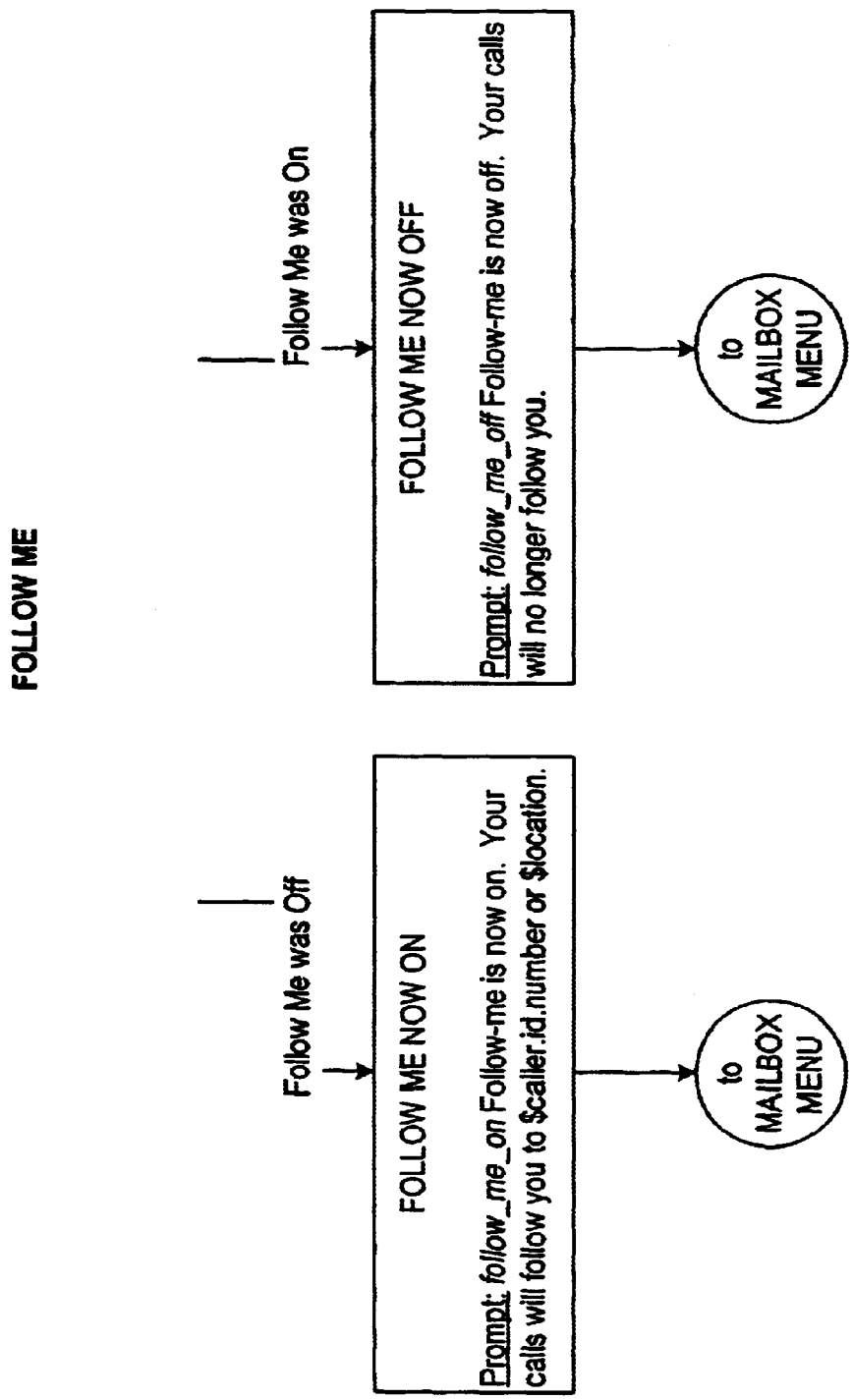

COMPUTER, INTERNET AND TELECOMMUNICATIONS BASED NETWORK

The present patent application is a continued prosecution application based on the provisional patent application Ser. No. 60/040,056, filed Mar. 3, 1997. The present patent application incorporates by reference herein provisional patent application Ser. No. 60/040,056.

Computer Program Listing Appendix

Compact disks containing a computer program listing are attached to this specification. The computer program listing contained on these compact discs is hereby incorporated by reference into the specification. The appendix comprises one compact disk containing the file "program_listing.txt" which is 1.09 MB in size. This file was created on Nov. 6, 2002 and contains the source code which was part of the provisional application with Ser. No. 60/040,056 to which this application claims priority. One duplicate copy of this compact disk is also included.

FIELD OF THE INVENTION

The present invention relates to a telecommunication system, and more specifically, the present invention relates to a network system based on internet, computer and telecommunication standards, utilizing internet and computer technology, a graphical user interface, integrated telecommunication applications and interactive voice recognition technology, facilitating the computation and telecommunication of voice and electronic data.

BACKGROUND OF THE INVENTION

Individuals and business people seek to communicate with each other, obtain useful information, interact commercially and entertain themselves in an increasingly mobile society. In order to fulfill these needs, one requires the ability to send and receive messages, access information and entertainment, conduct business transactions, organize daily schedules and stay in touch with homes and offices from almost anywhere, at any time, as easily as making a telephone call.

Continued demand for products and services that address these needs is evidenced by the increasing number of electronic devices, and the explosive growth of the internet and network services. Advances in wireless telecommunication technologies led to the development of such devices as personal digital assistants, and enabled the growth of paging and cellular telephone networks. Devices such as notebook and sub-notebook computers with modems (both wireline and wireless) have allowed mobile professionals to connect to their PCs from almost any location, as well as to access on-line information and electronic mail services while traveling worldwide.

In addition, communication and information needs have stimulated the growth of the internet, on-line networks and corporate intranets. These networks now host a variety of services such as e-mail, database searching, conferencing, electronic commerce, games, software libraries and electronic newspapers and magazines. However, despite the proliferation of communication devices and the development of the internet, on-line networks and corporate intranets, significant barriers remain to fulfilling user needs for access to and management of personal, professional and public information.

The hardware designs and software technologies which enable today's communication are complex. Information, though widely available, can be either inaccessible or accessible only by navigating through a host of phone systems, operating system platforms, databases and networks. As a result significant amounts of time and effort are required of those who use and depend on these devices, networks and services to communicate and obtain information.

The problem of accessing and processing all of the information available from communication devices, networks and services is particularly acute for mobile business professionals. Today's mobile professional, working out of the home or small office, may have a cellular phone, a pager, a computer, a fax machine, an electronic mailbox on the internet, and a voice-mail service. Whether on the road, in a plane or at the office, success for the mobile professional depends in large part on the ability to easily and quickly access, sort through and respond to the messages delivered to each of these communication devices, and to obtain information necessary to the conduct of business from proliferating networks and services.

SUMMARY OF THE INVENTION

The present invention is a network system, which is based on internet, computing and telecommunications standards, utilizing computer and internet technology, an innovative graphical user interface, integrated communication applications and interactive voice recognition technology. The present invention is a unified messaging service which will be accessible from any standard communication device (telephone, computer or internet), and will give the user intuitive voice command of personal, professional and public information.

This unified messaging service is a useful tool to those whose time and resources are limited and for whom communication is critical, such as mobile business professionals in the small office, home office market. The mobile business professional must maintain access to personal and professional information and developments, respond to customers and communicate with colleagues, family and friends at any time and from any location. The unified messaging service is designed to meet these objectives by offering a single point of access to all communications, integrated with personal information management tools and customized public content delivery.

Small office, home office professionals, most of whom do not have access to dedicated information management systems or the benefit of administrative support staff, may derive unique value from this shared network solution.

An embodiment of the present invention is an Internet controlled telephony system that can be accessed either through a telephone handset or a web page. When accessed by a telephone handset it can be manipulated by DTMF or voice recognition. When accessed by a web page, it can be driven by Java or cgi.

An embodiment of the present invention works by giving each subscriber a local phone number, an 800 number or a 500 number. Through the use of this number the system may implement follow me calling. Follow me calling may also use a pager and can use pagers for notification or meet me paging.

In an embodiment of the present invention, incoming calls can be screened for both a message from the caller and playing the caller's identification.

An embodiment of the present invention also provides voice mail and all typical voice mail features.

An embodiment of the present invention also allows the user to make outbound calls from the handset.

Another embodiment of the present invention receives faxes on the same number as it receives phone calls. These faxes can be forwarded to email, another fax machine or can be stored and forwarded at a later time by a subscriber.

An additional embodiment enables email to be read to a subscriber through a handset and the system has the ability to read headers to inform the subscriber of the length of the message and to summarize the email.

In other embodiment of the invention, the system can ocr faxes and forward them to the subscriber.

An embodiment of the present invention allows the subscriber to make calls from his web page. This allows, among other things, international call back.

Another embodiment of the present invention enables the subscriber to see his voice mail on his web page. Information such as call duration and caller ID may be displayed. This information is updated as new messages are received.

An embodiment of the present invention enables the subscriber to respond to email messages using a voice attachment to an email.

In another embodiment of the present invention, the system allows the subscriber to change the status of his particular environment on the web or handset.

Another embodiment of the present invention allows a subscriber to obtain all billing information via a web page.

A further embodiment of the present invention allows the subscriber to display the Automatic Number Identification of a voice mail message and then return the call by clicking the appropriate button on the web page.

Another embodiment allows conference calls can be initiated either from the handset or a web page.

A still further embodiment allows calls to be received and screened while another call is active. Additionally, calls may be put on hold and retrieved.

Another embodiment of the present invention keeps and manages phone directories of the subscriber and allows the subscriber to call telephone numbers from other applications. These phone directories are available either from the web page or the handset.

An embodiment of the present invention, all or some of the information about follow me calling is maintained by and managed on the web page but may also be modified through the use of the handset.

Another embodiment of the present invention informs subscribers via a web page who is calling and allows the subscriber to decide whether to take the call.

An embodiment of the present invention will deal with security and fraud issues.

An embodiment of the present invention will have multiple prompt levels.

Another embodiment of the present invention will have the ability to create and send faxes from a computer application.

A further embodiment of the present invention will be able to do predictive dialing and leave messages. It will be able to make calls from a list using its predictive dialing features.

An embodiment of the present invention will keep a complete record of all calling activity.

An embodiment of the present invention will be able to make multiple calls from the web without hanging up. Only the outbound leg of the call will be terminated.

In another embodiment of the invention, the API of the system is open and published. With proper authorization, anyone using Java or other programming tool can program the system and create applications. This can be done from any client and any client can drive the server.

An embodiment of the invention has the ability to import phone directories.

BRIEF DESCRIPTION OF THE DRAWINGS

A Preferred embodiments of the invention are explained below with references to the accompanying drawings in which.

DETAILED DESCRIPTION OF THE PREFERRED EMBODIMENTS

Figure 2:
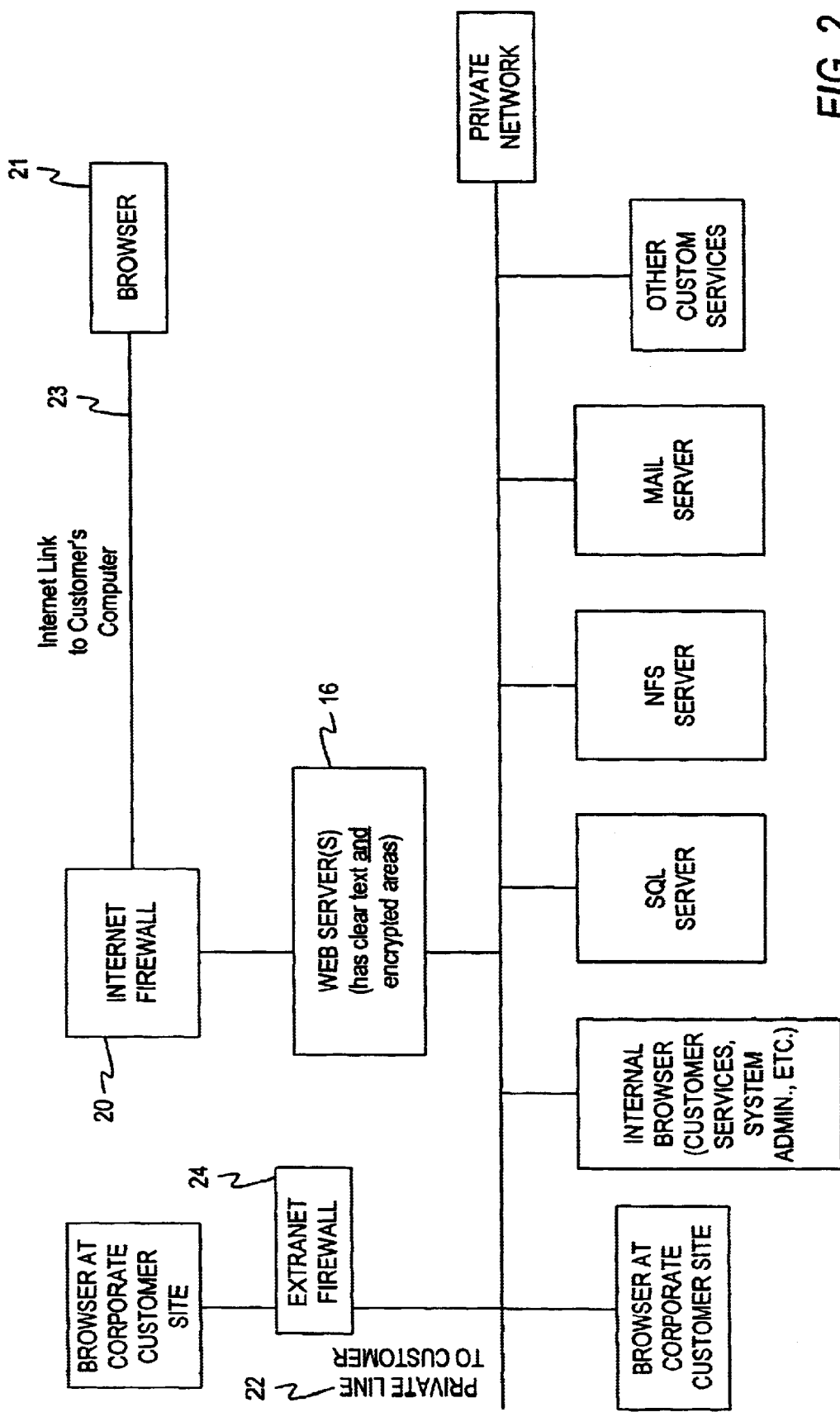
FIG. 2 is a functional block diagram of the internet platform embodying the present invention.

The present invention is a network system that works, among other things, as your voice-mail system, using an 800/888 number that receives all your calls, faxes, pages and e-mail. The system provides a contact database facilitating the placing of calls, screening of calls, and tracking you down wherever you are.

Regardless of how the message was transmitted, every message is delivered to you through a single source, whether telephone, internet or computer. You can also review your latest call records and billing information and change or add to your phone listings, contact numbers and service preferences through this source.

The present invention utilizes a fault resilient redundant system, residing in two separate sites. There are multiple T-3 (45 Mbps) facilities going into each of those sites. Both sites sit on a fiber-channel fiber optic loop, which is theoretically "self healing" in case of a disaster and can route a phone call to either site, depending on where the route is broken.

The configuration at each site is a cluster of servers. FIG. 1 is a block diagram of the hardware platform showing one of these clusters 10 which consists of some voice servers 12, some mirrored Sybase database servers 14, and some web servers 16 where the web access and services are located. The computers (not shown) are 200 MHz Intel-based 19" rackmount servers running a combination of Solaris and SCO UNIX operating systems. The voice server 12 includes certain functions, such as telephony, automatic speech recognition, text-to-speech, conferencing, etc. Subscribers are connected to these clusters by either normal telephone connections or by internet connections.

Each cluster can serve about 10,000 customers. The system is open-ended allowing for the addition of subscribers as needed. Further the design facilitates the easy addition of hardware and software.

FIG. 2 shows a block diagram of the internet platform. The system may be accessed via the internet instead of a normal telephone connection (voice or touchtone). The subscriber can access the web server 16 through an internet firewall 20. The subscriber merely enters the system's web site and then can access his account through a security program. Once in his account, the subscriber can access various features such as playing voice mail, reading e-mail and faxes, managing contacts and schedules, among other services. Further, the system can provide a private line 22 for corporate and other subscribers which can enter the web server 18 through an extranet firewall 24.

Figure 3:
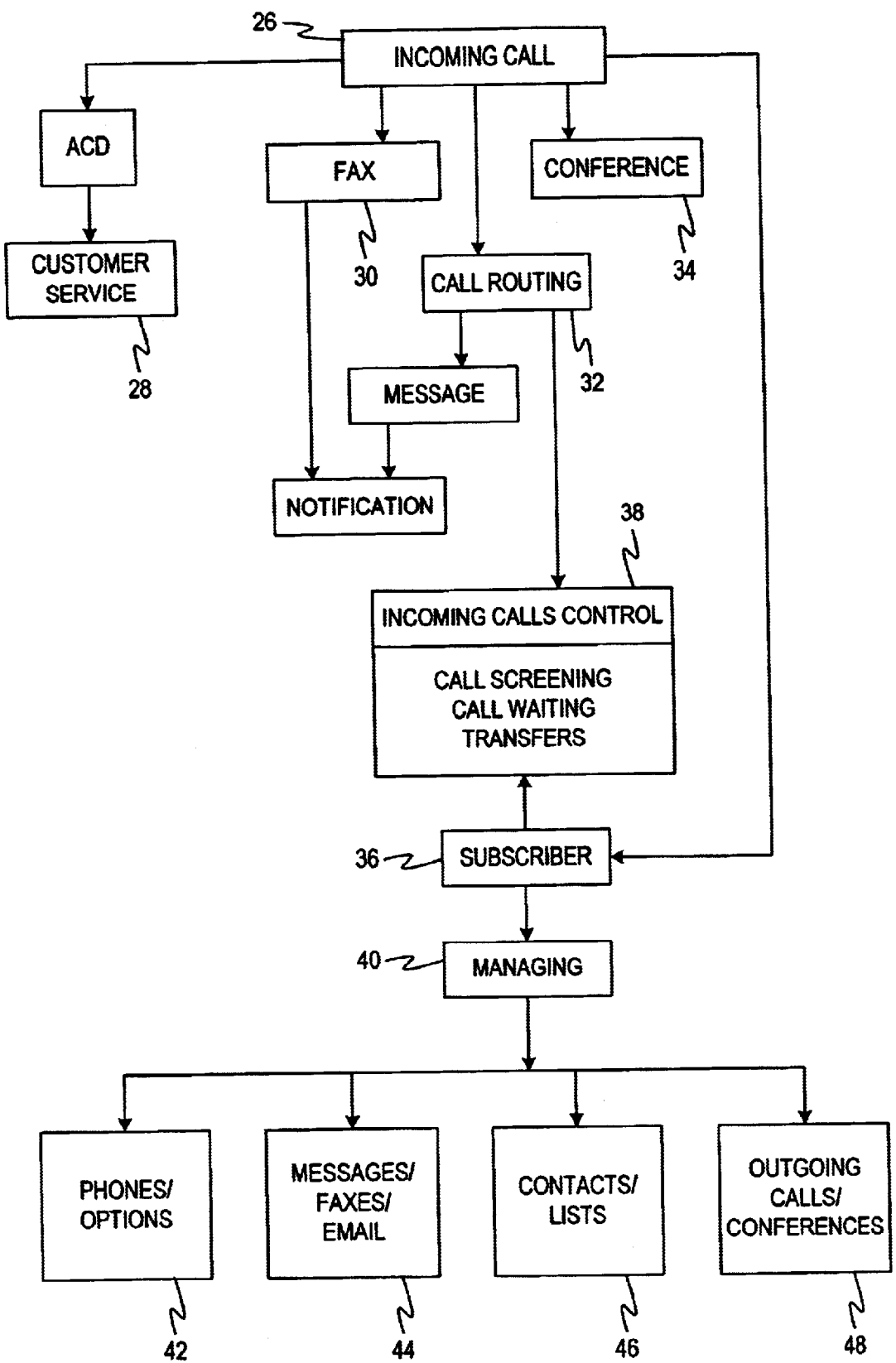
FIG. 3 is a general application flow chart embodying the present invention.

FIG. 3 shows a general application flow chart for an incoming call 26 to the system. The incoming call 26 whether by telephone connection or internet connection is directed either to customer service 28 (through an automatic call distribution-ACD), fax 30, call routing 32, or conference 34 function. Call routing 32 is determined by the incoming call control 38, previously set by the subscriber, and can include a message and notification to the subscriber, call screening, call waiting, and the transfer of the call. Further, if the incoming call 26 is a subscriber 36, the system will provide additional functions to the subscriber, such as controlling incoming calls 38, including call screening, call waiting and transferring calls. The subscriber may set priorities to certain callers allowing only certain callers to reach the subscriber while all others are sent to voice-mail to record a message for playback later.

Also, the subscriber will be able to manage 40 his account. Managing 40 includes setting the options for telephone calls 42, setting the options for sending and receiving messages, faxes and e-mail 44, managing the database containing the subscriber's contacts and other lists 46, and setting the parameters for outgoing call and setting up conferences 48.

Figure 4A:
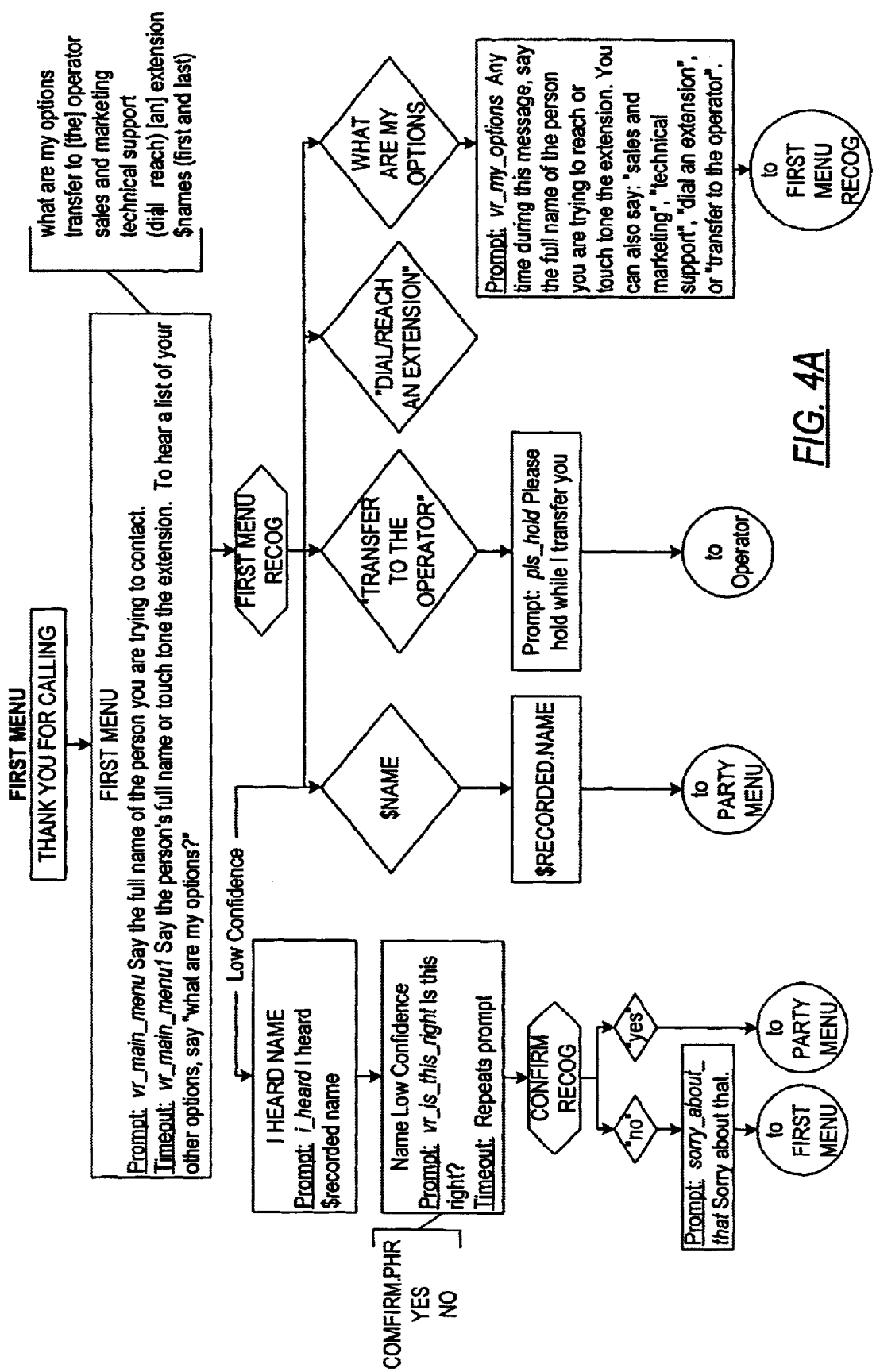
FIGS. 4A–4R are detailed application flow charts embodying the present invention.
Figure 4B:
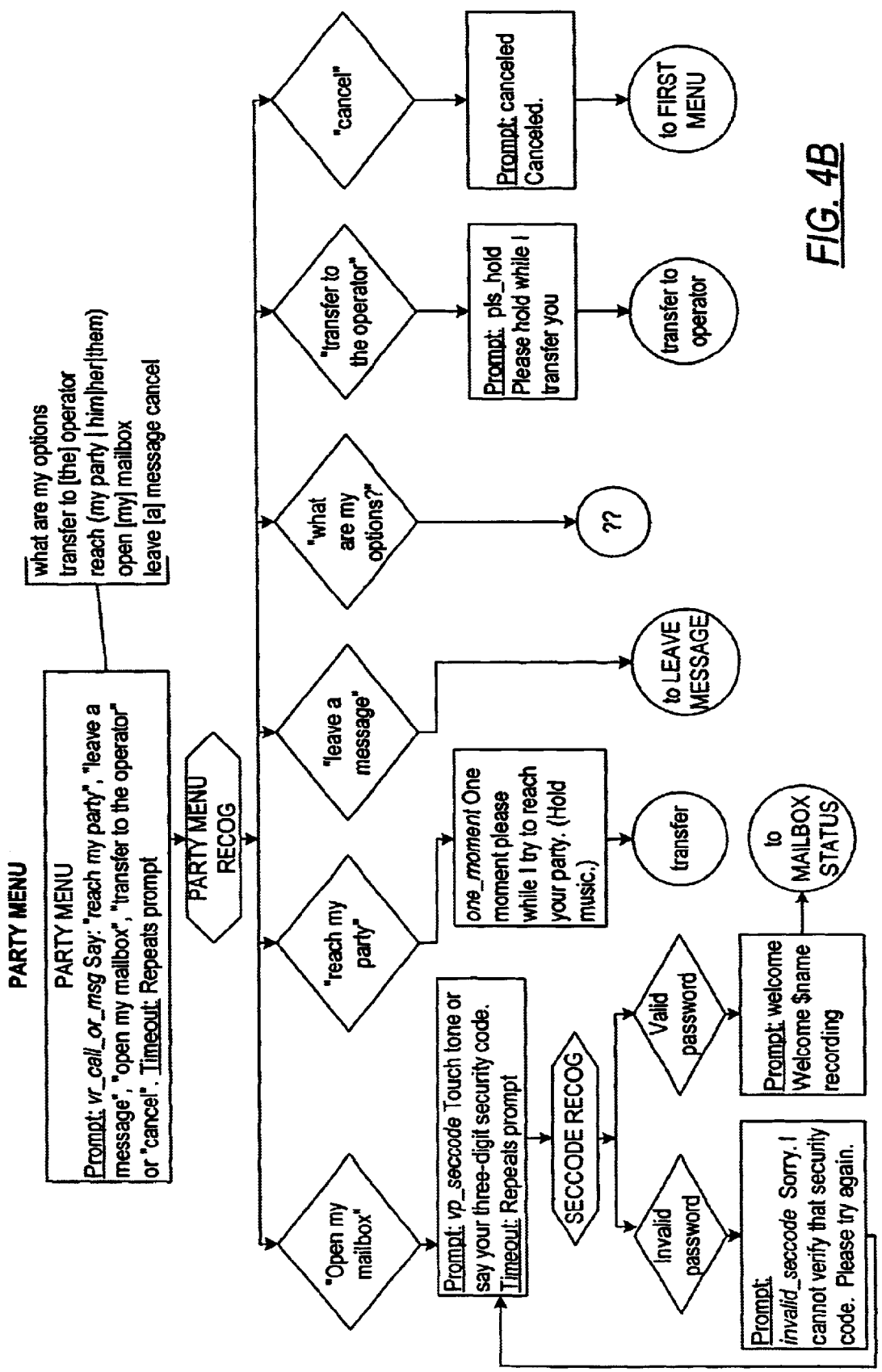
Figures 1, 4C:
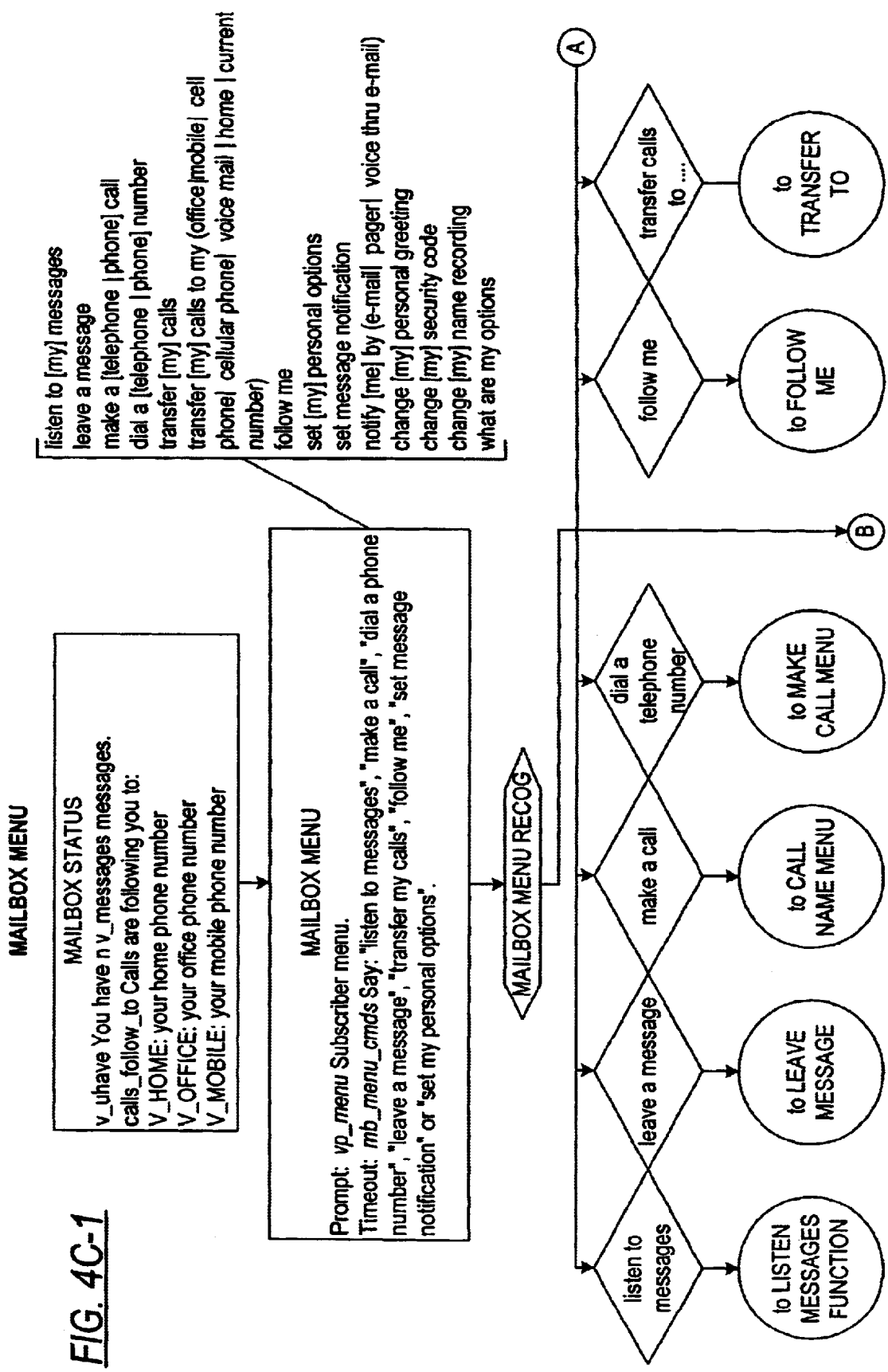
FIG. 1 is a functional block diagram of the hardware platform embodying the present invention.
Figures 2, 4C:
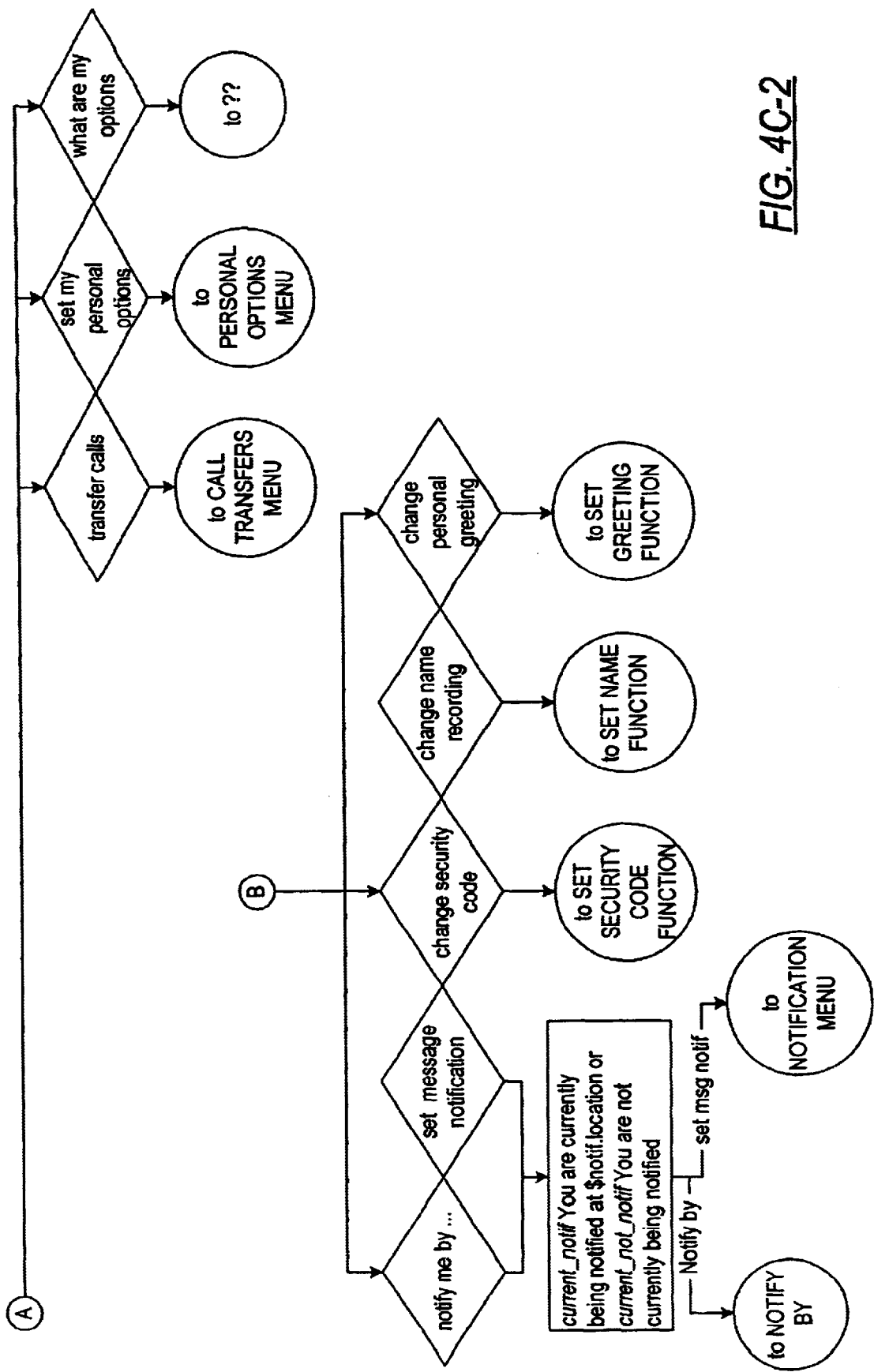
Figures 1, 4D:
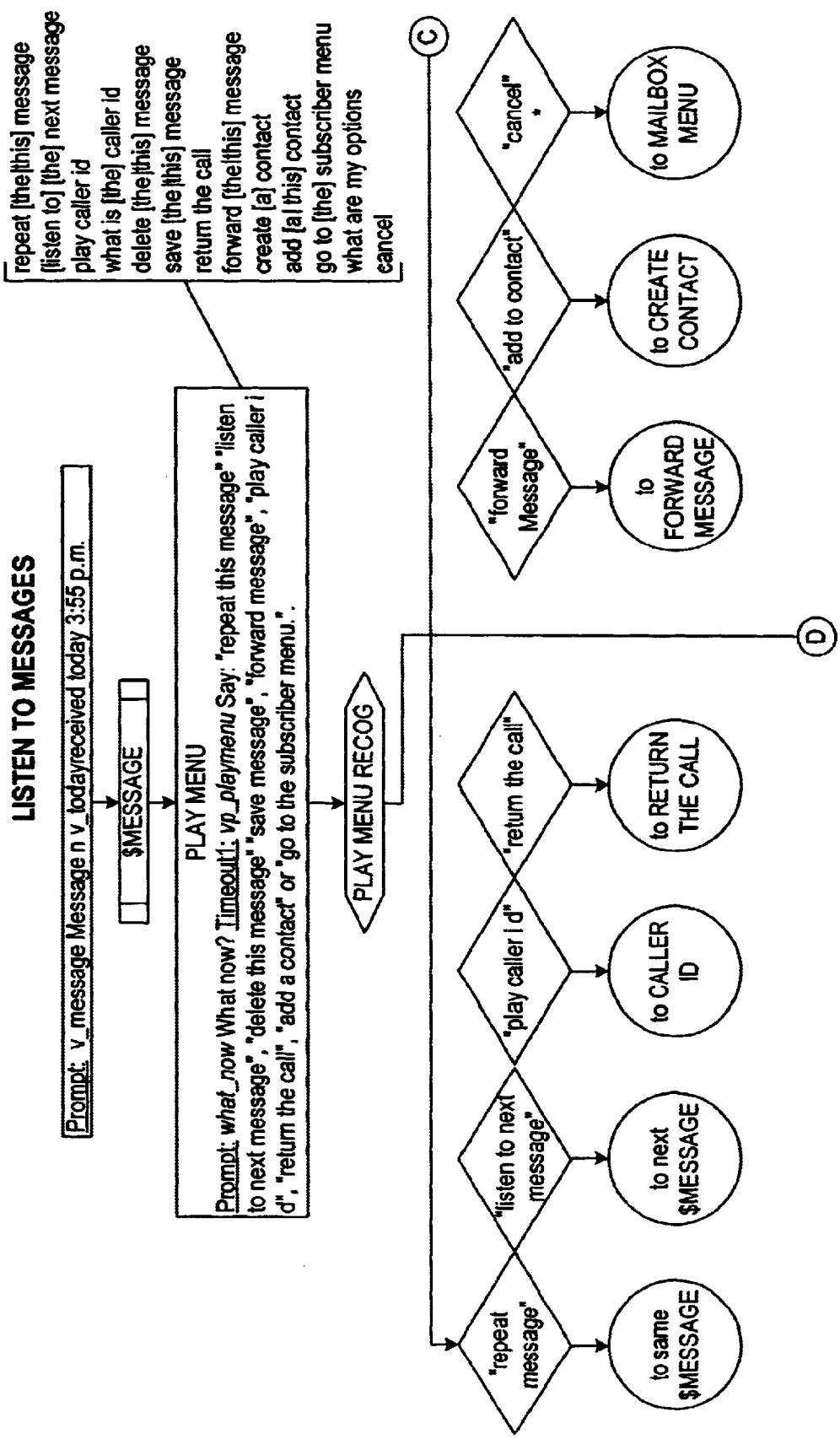
Figure 4D:
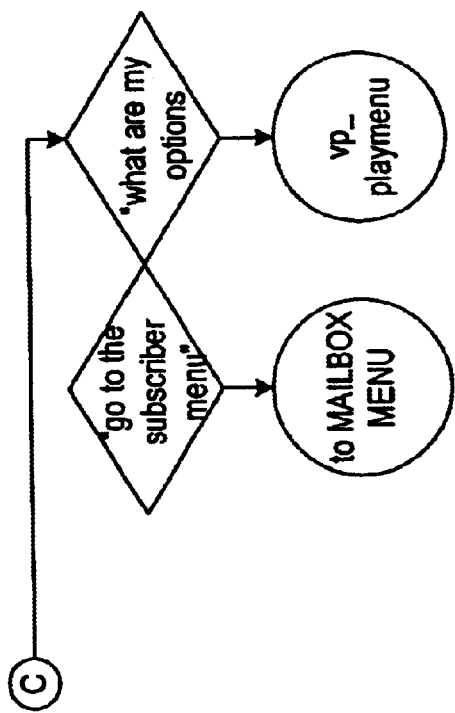
Figure 2:
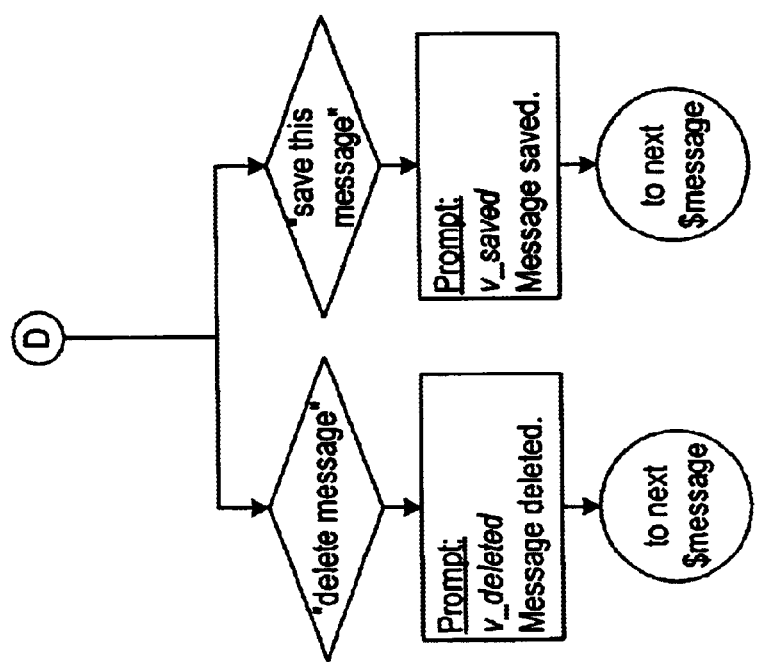
Figure 4E:
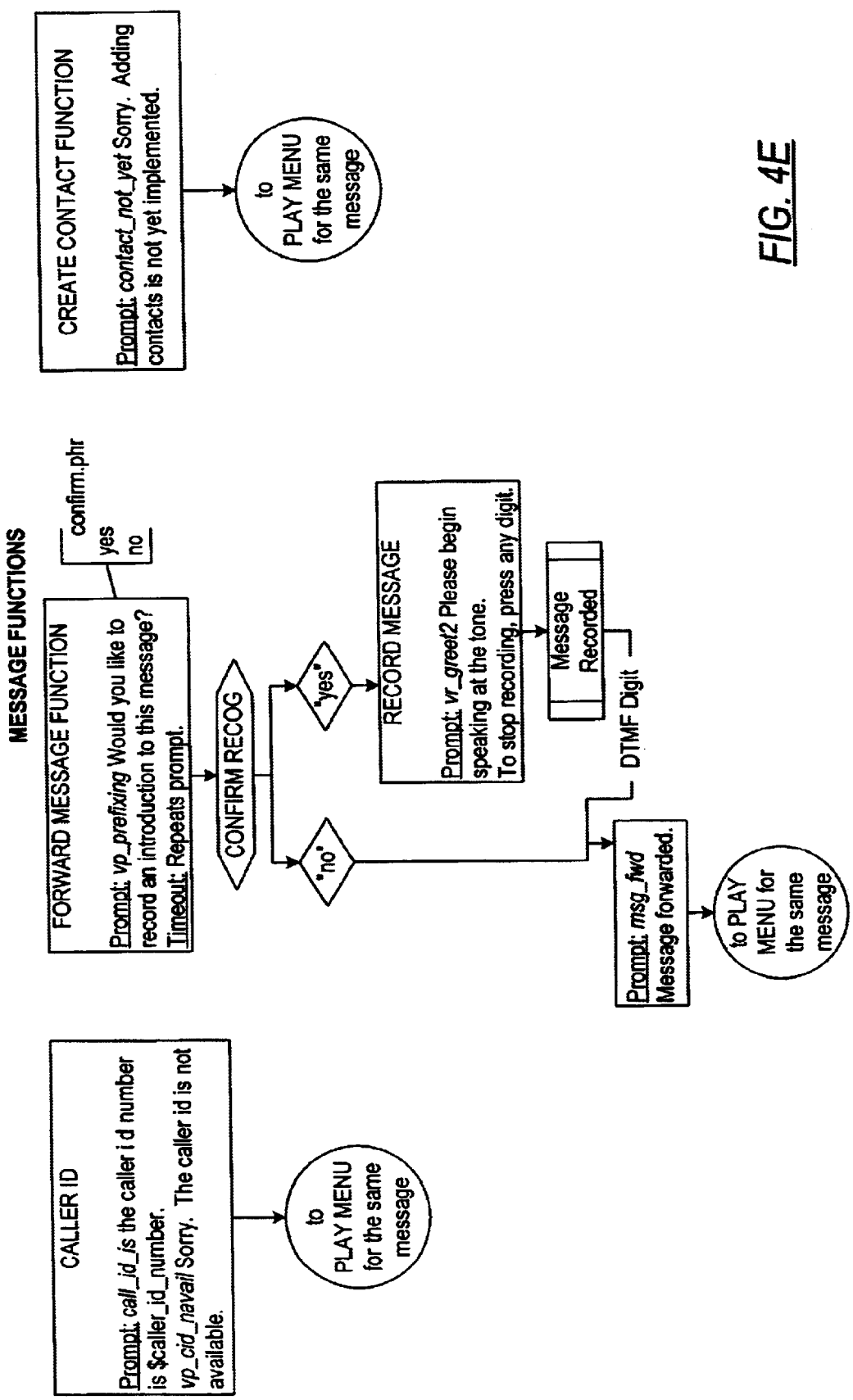
Figure 4F:
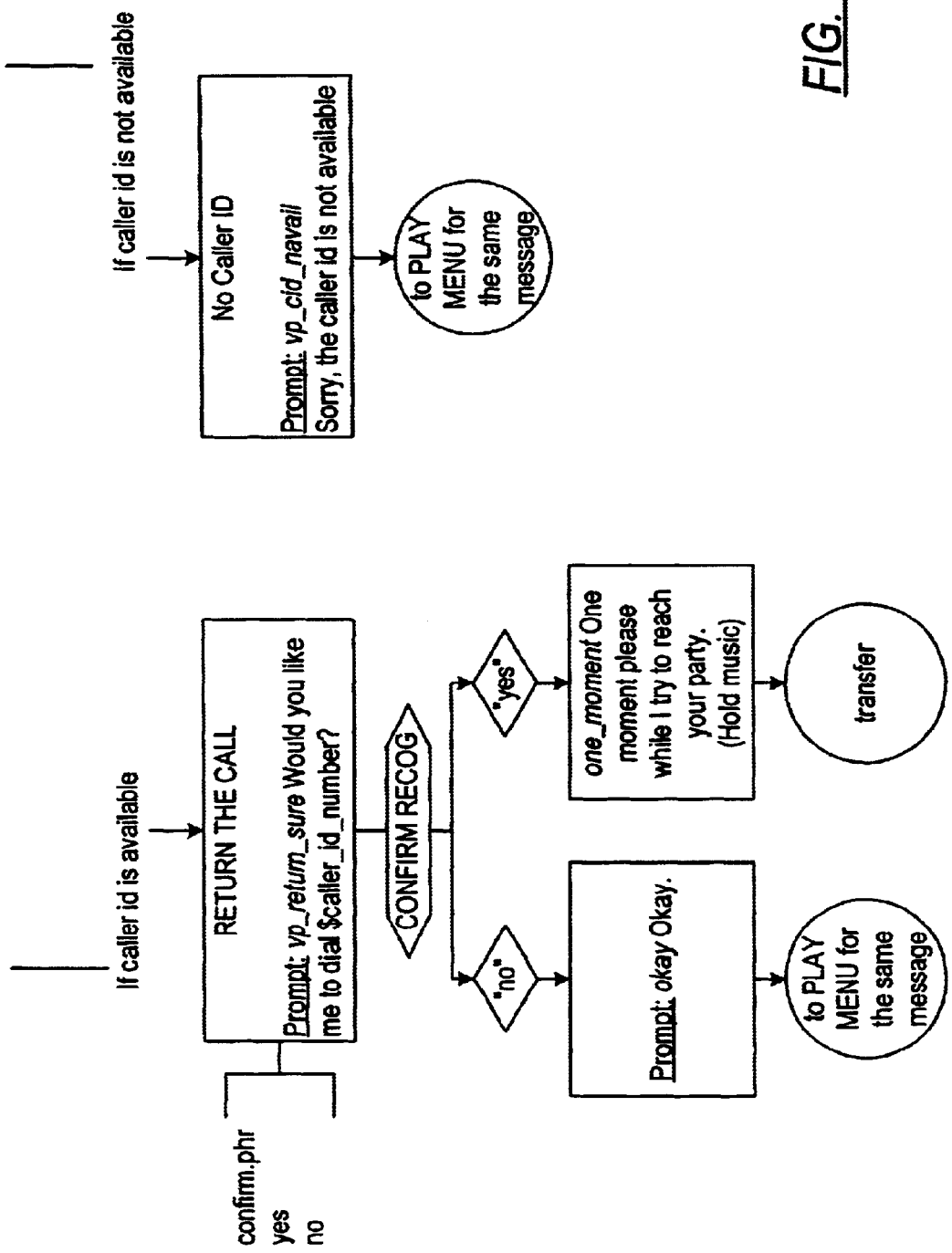
Figure 4G:
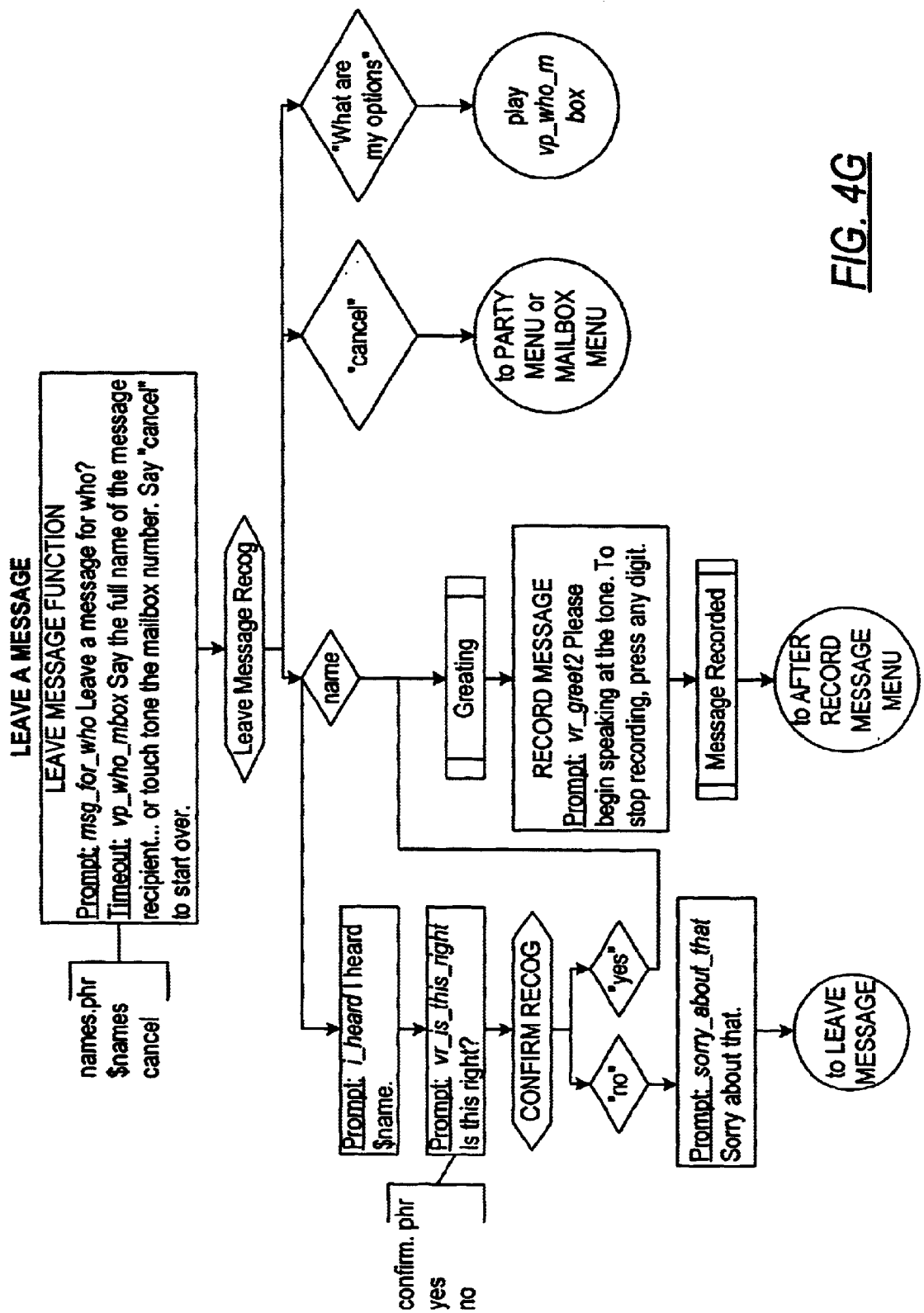
Figure 4H:
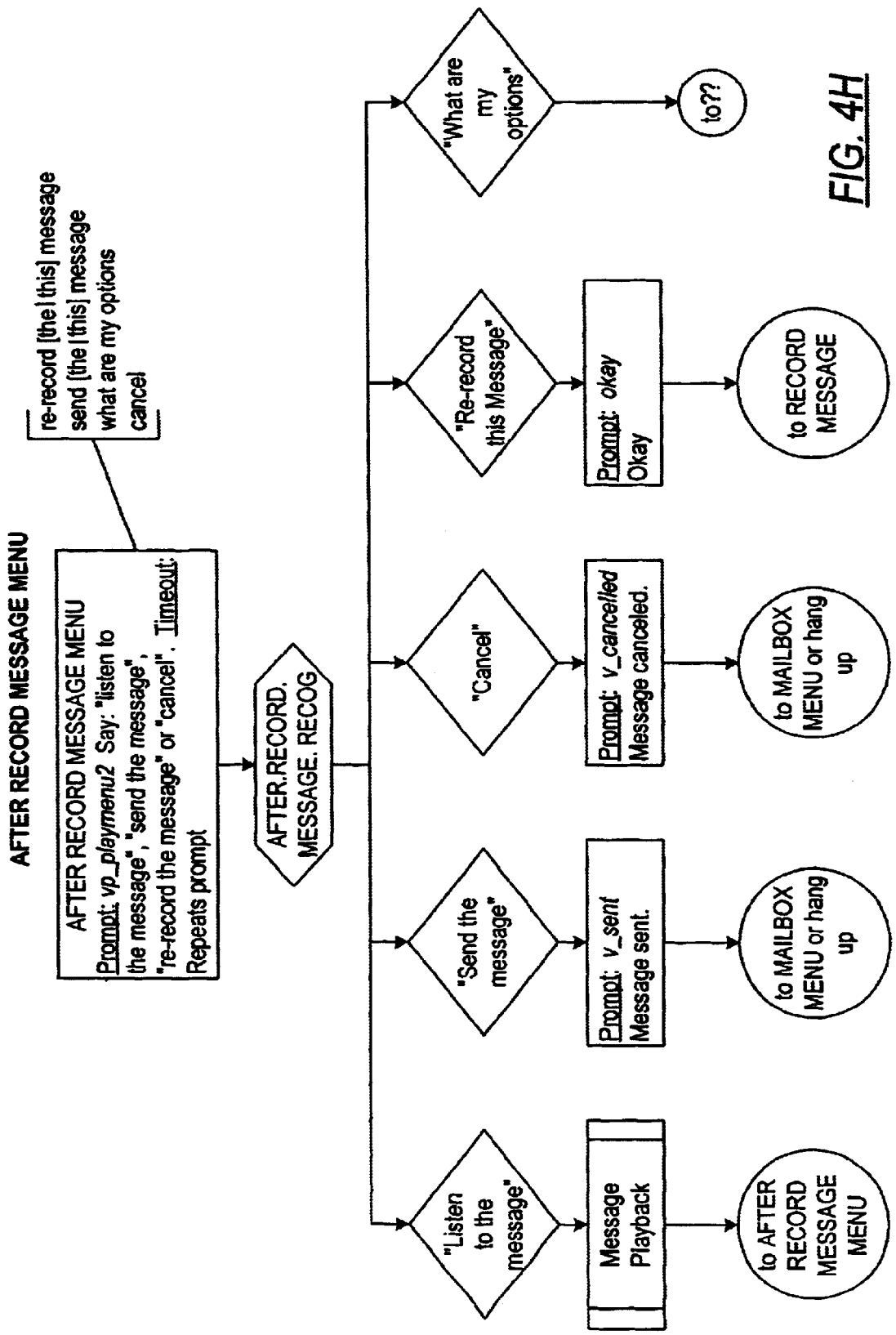
Figure 4I:
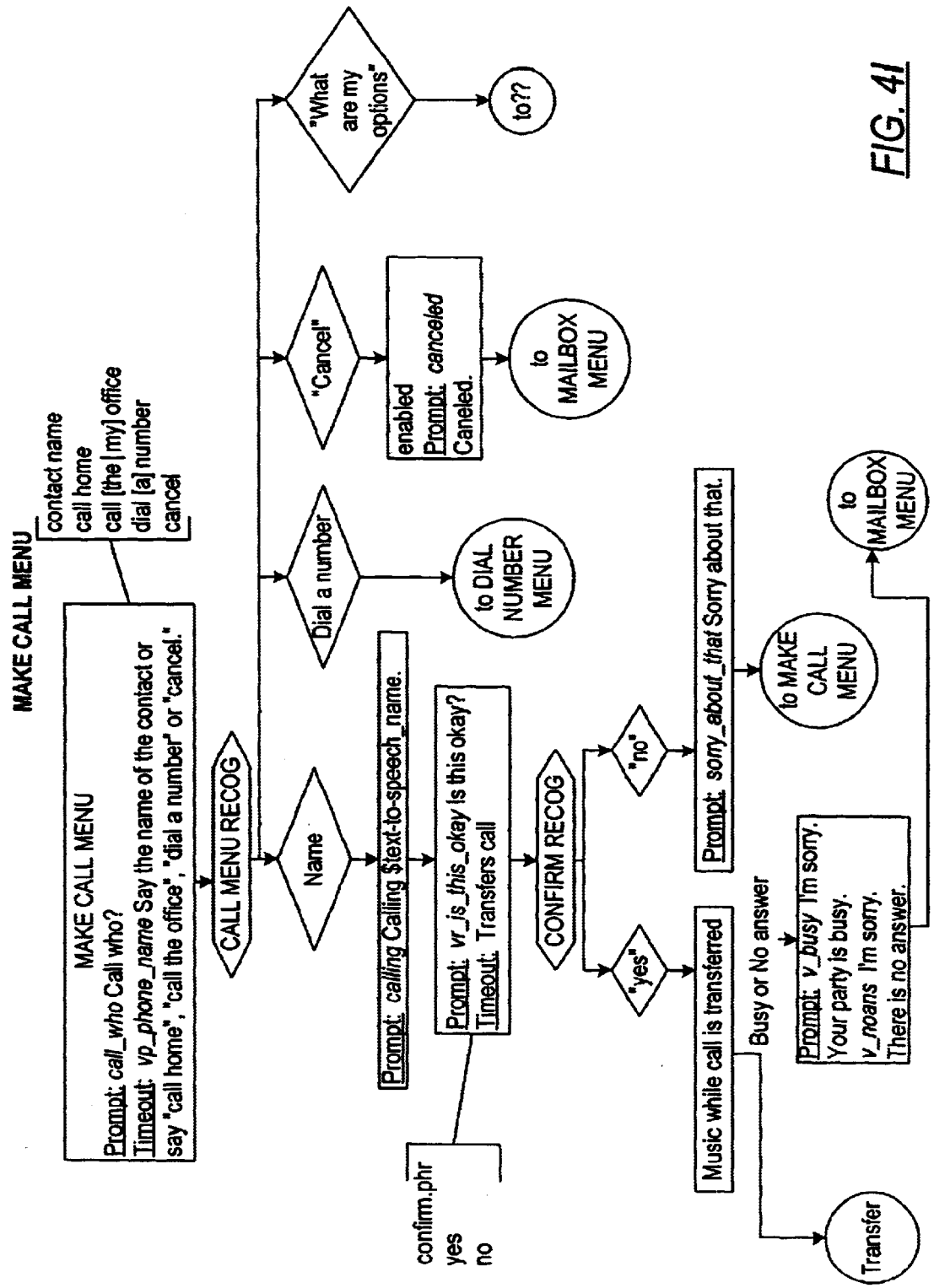
Figure 4J:
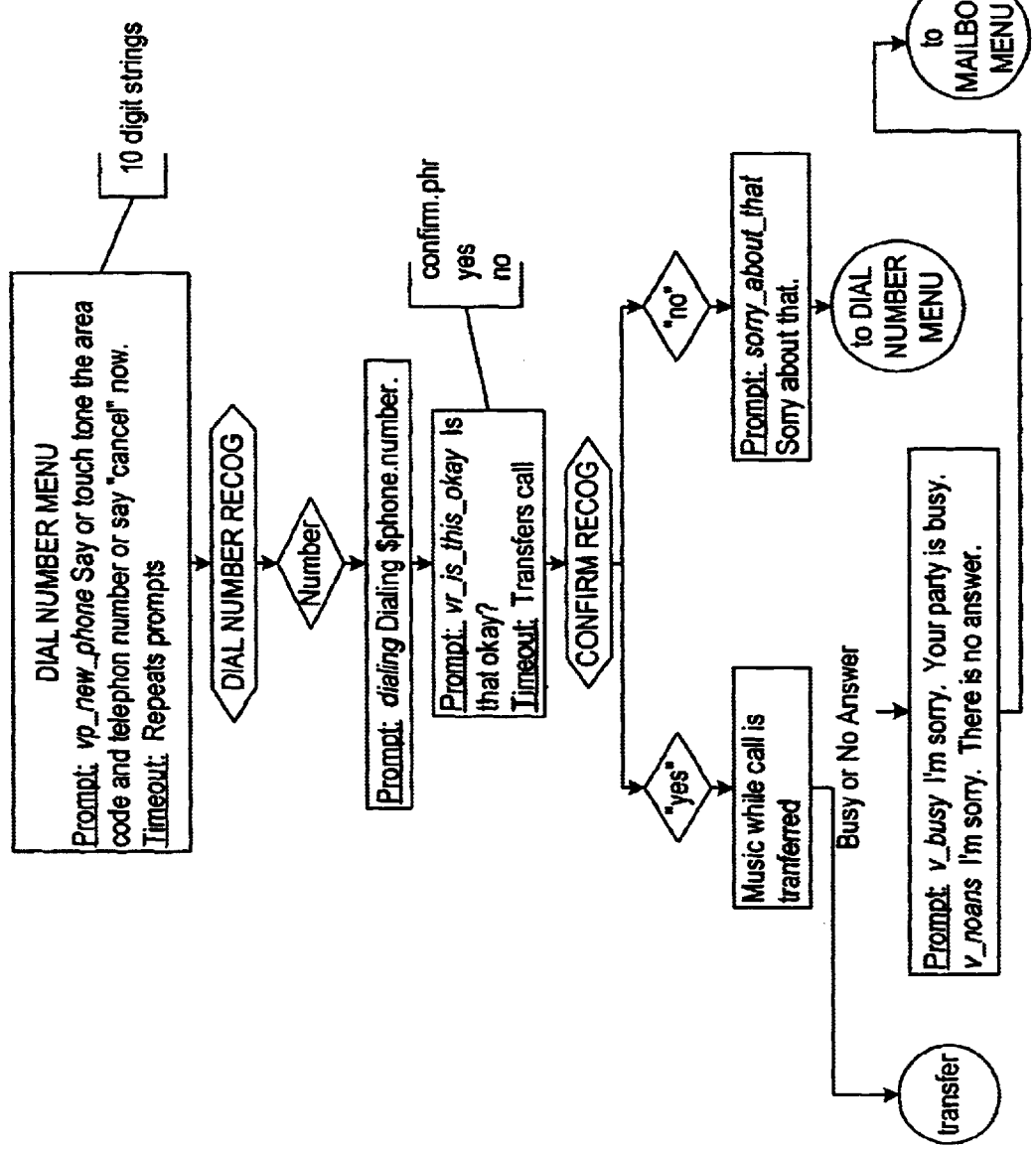
Figure 4K:
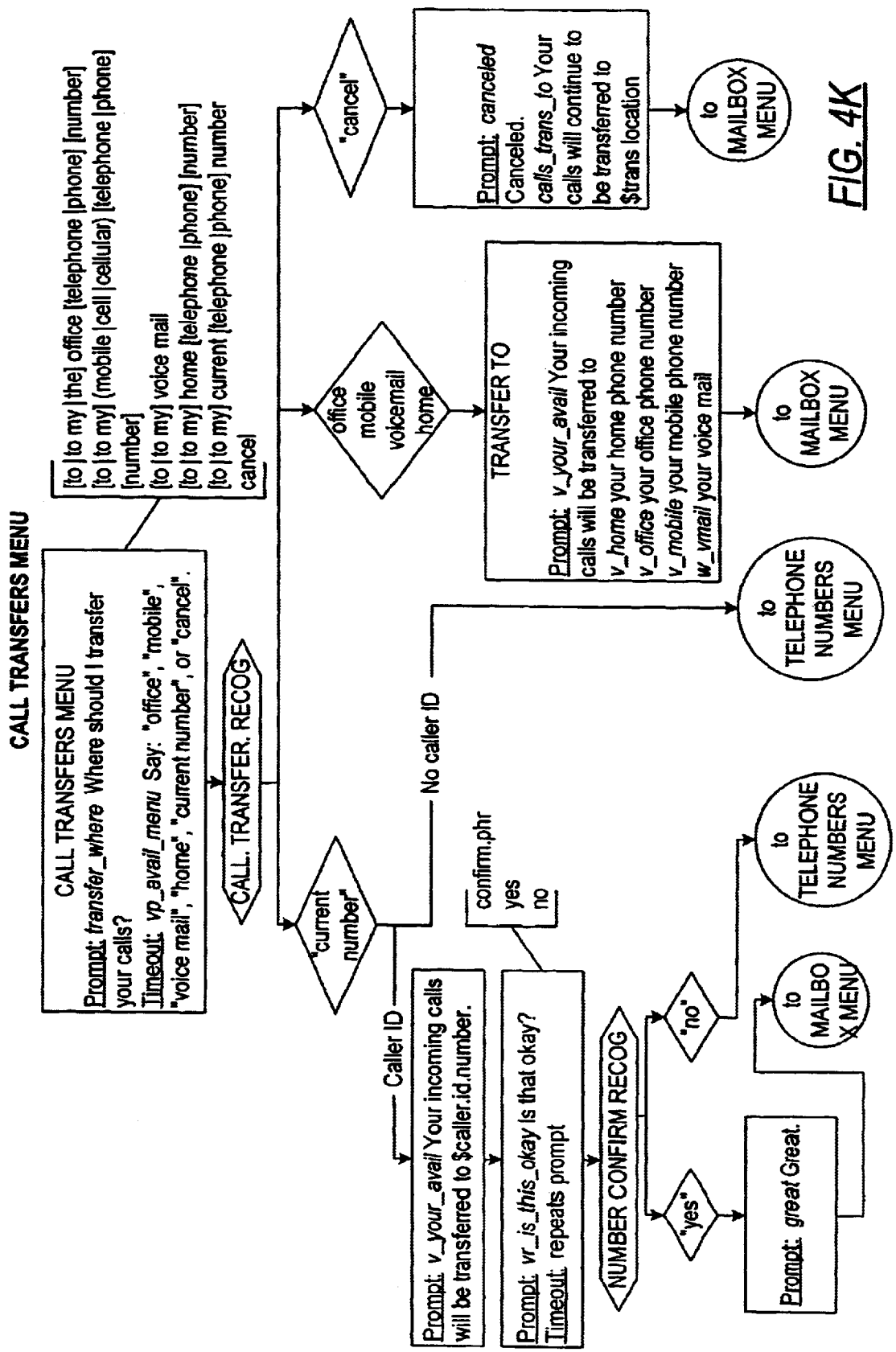
Figure 4M:
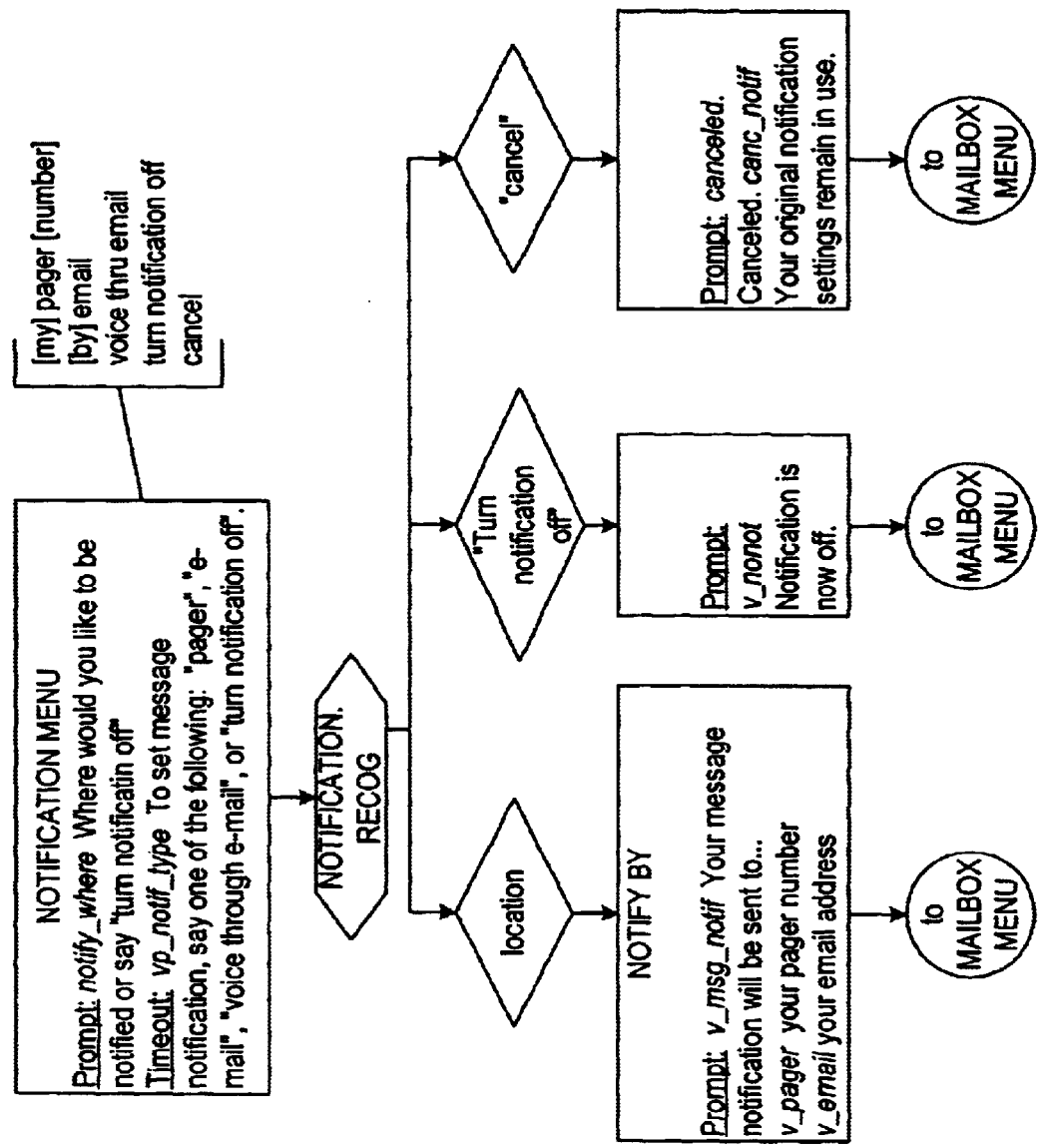
Figure 4N:
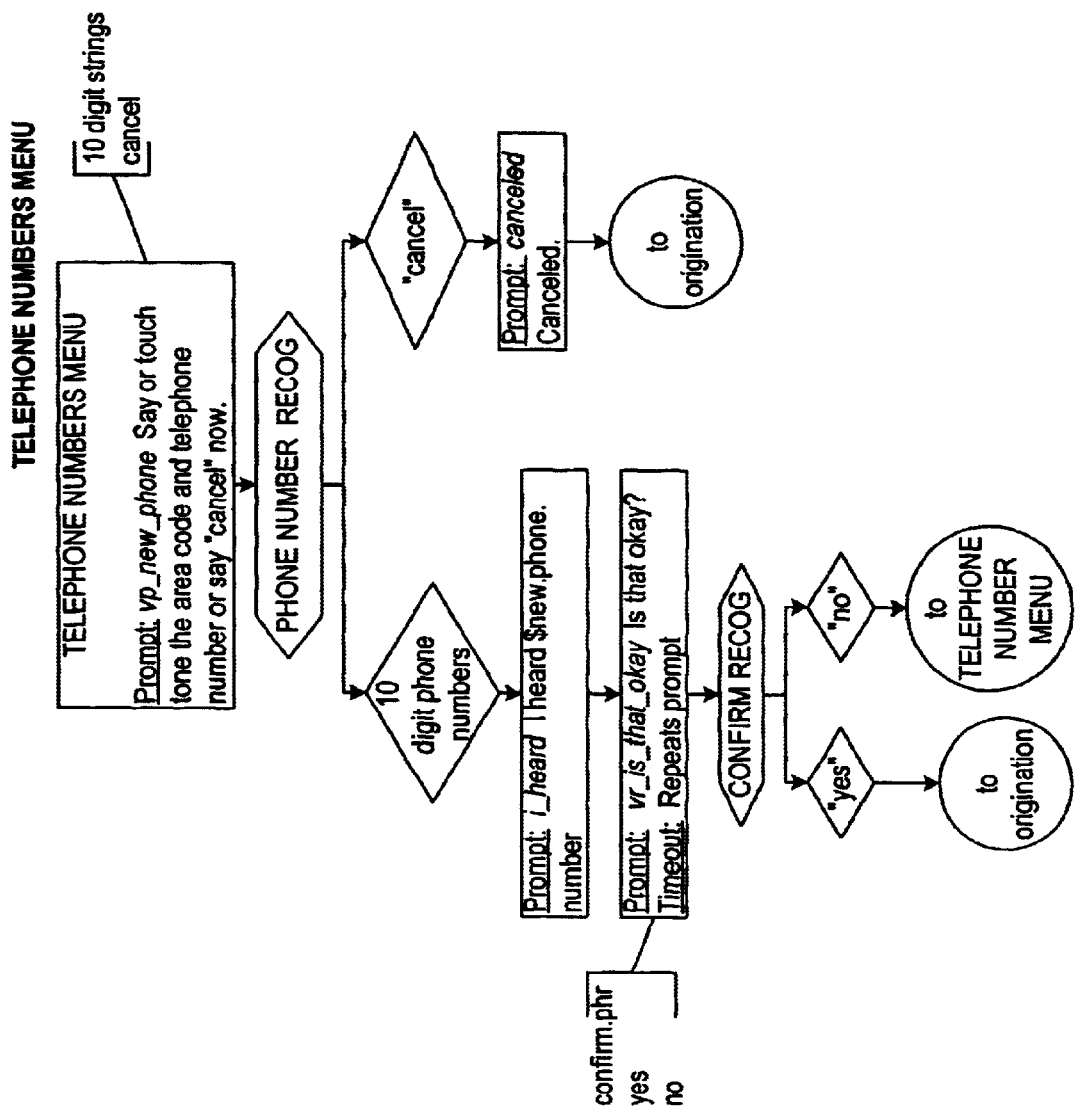
Figure 40:
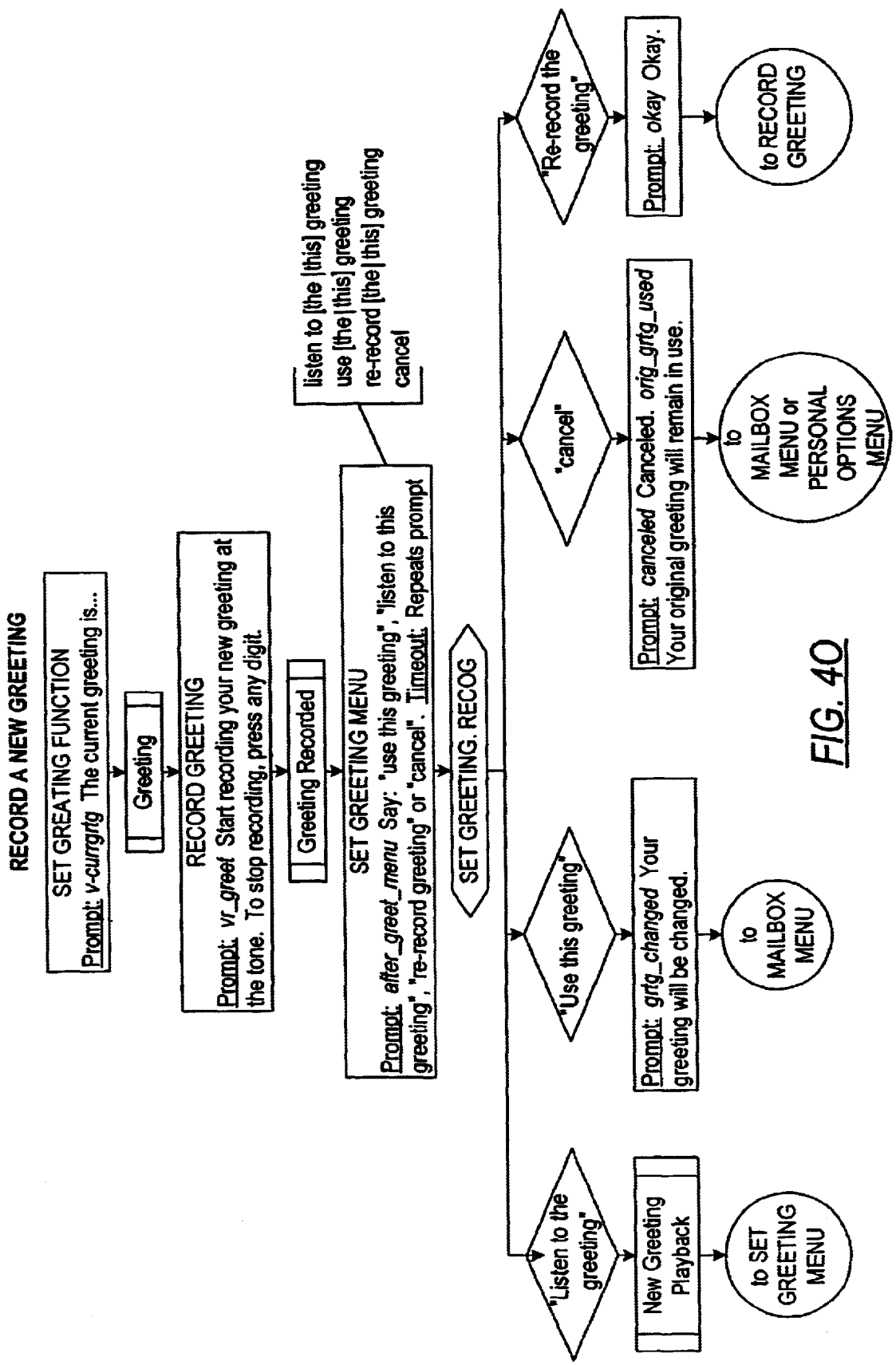
Figures 1, 4P:
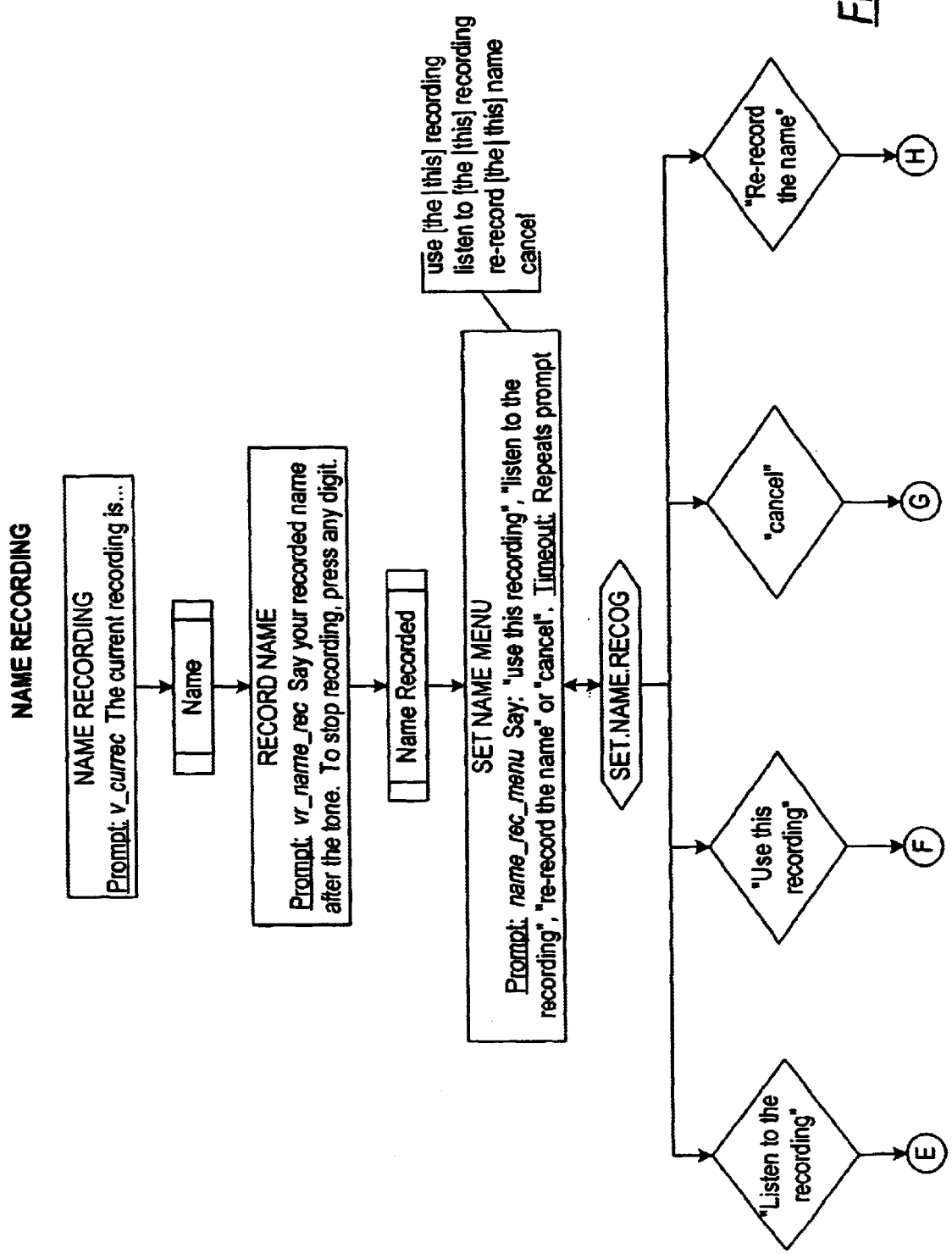
Figures 2, 4P:
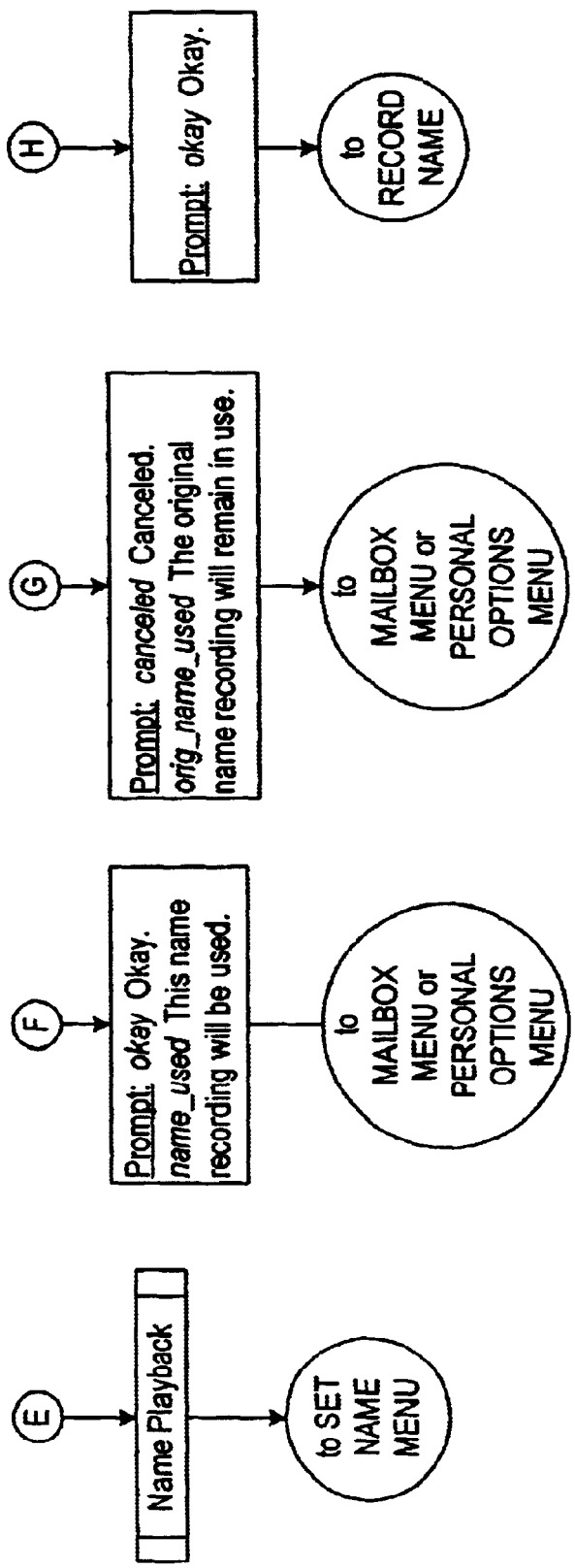
Figure 4Q:
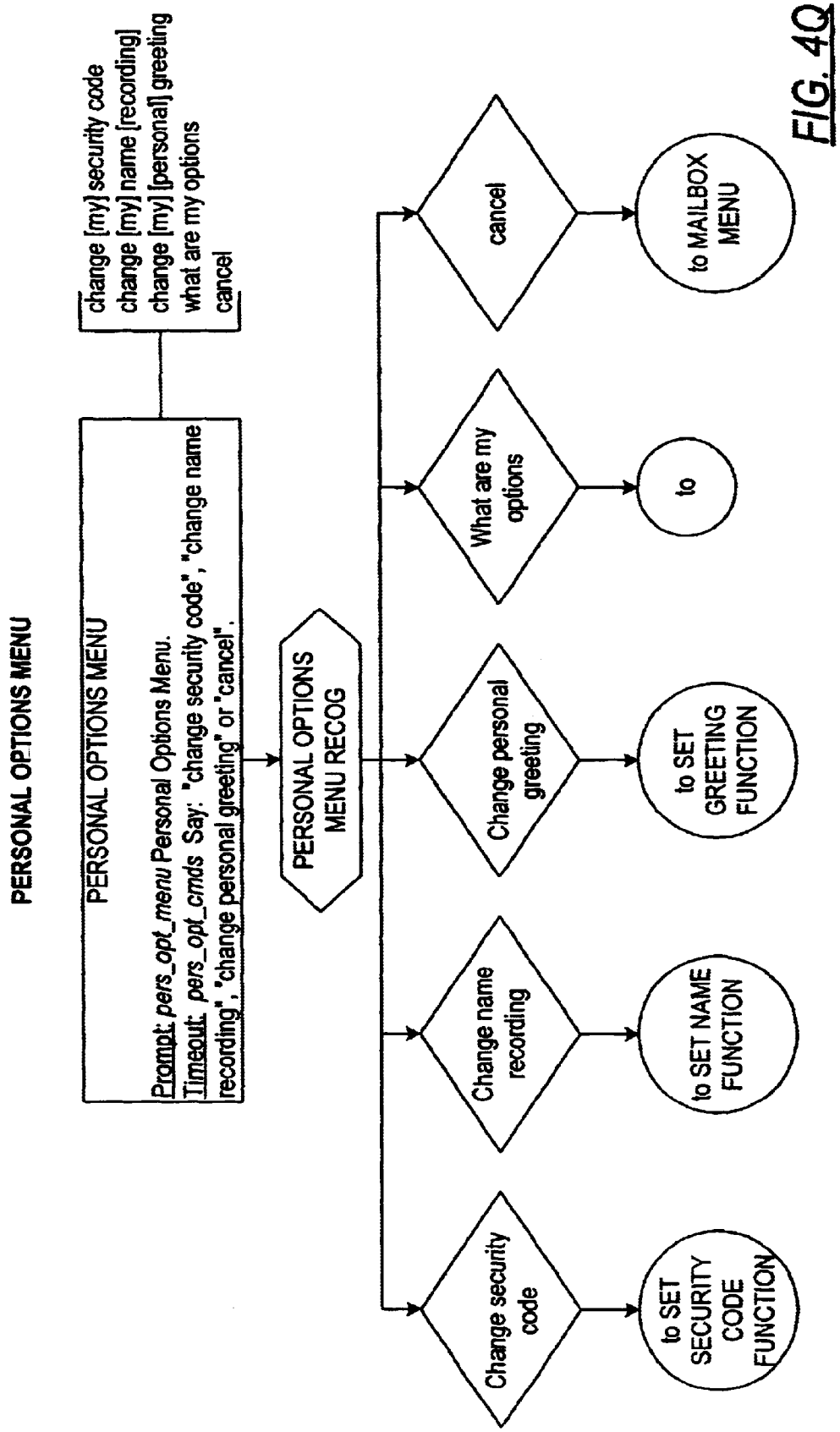
Figure 4R:
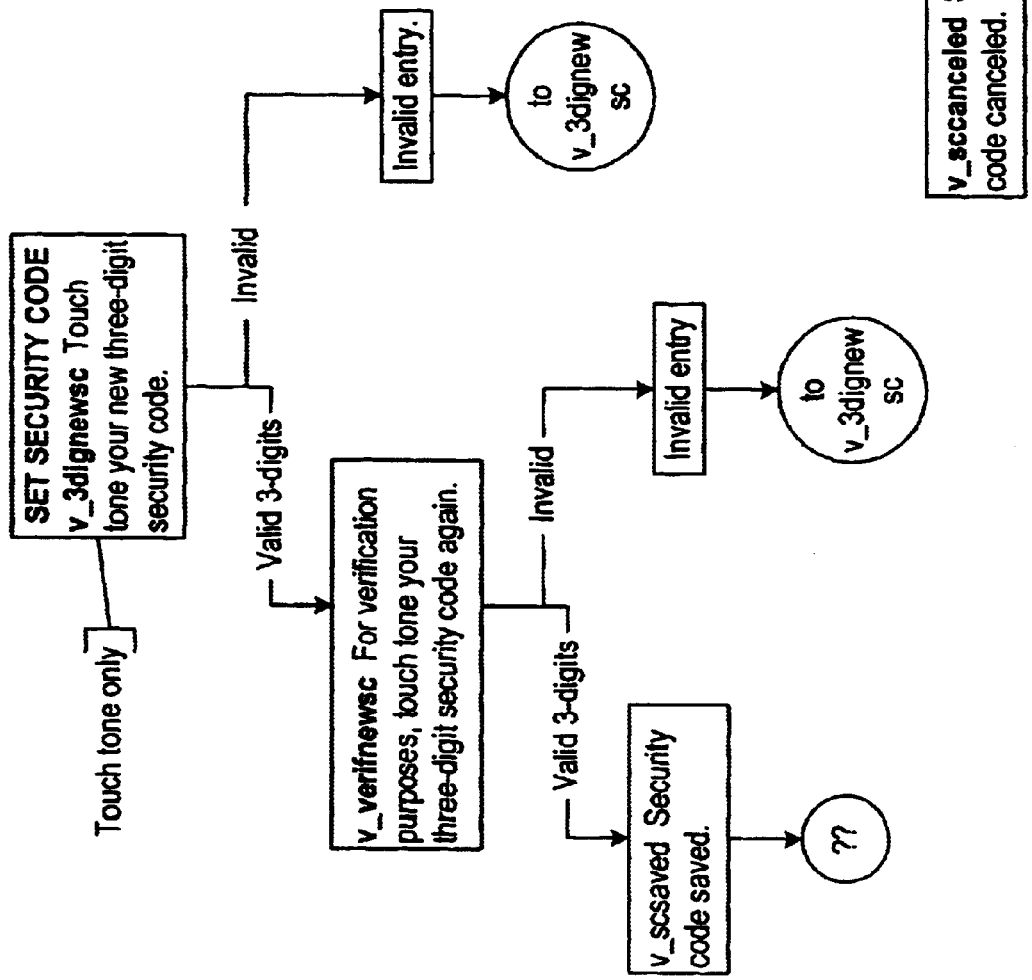

FIGS. 4A through 4R show a more detailed flowchart of the present invention. FIG. 4A shows the First Menu encountered by a subscriber or an individual calling the system's 800 telephone number. The caller is explained the different options and then the system, if requested, attempts to recognize the subscriber or party's name or extension that the caller is trying to reach.

FIG. 4B shows the Party Menu which allows the caller to begin the transfer to the party he is trying to reach, leave a message, or, if the caller is a subscriber, open his mailbox. FIG. 4C shows the Mailbox Menu which allows the subscriber to listen to his messages, leave a message, make a call (using the database), dial a telephone number, request the system to follow the subscriber, transfer calls, and set other personal options, including the greeting, security codes, etc.

FIG. 4D shows the Listen to Messages Menu which allows the subscriber to listen to, forward, or return the message, along with other options such as adding a contact, etc. FIG. 4E shows the Message Menu such as forwarding the message, providing caller identification information, and updating the contact database.

FIG. 4F shows the Return a Call Menu which-will attempt to use caller identification to return the call. FIG. 4G shows the Leave a Message Menu which allows the caller to leave a message to the intended party. FIG. 4H shows the After Record Message Menu which allows the caller to listen to the message, re-record the message, send the message, or cancel the message. FIG. 4I shows the Make Call Menu which allows the subscriber to dial a number, cancel, or attempt to obtain a contact and transfer to that contact.

FIG. 4J shows the Dial a Number Menu which allows the subscriber to dial a telephone number. FIG. 4K is the Call Transfers Menu which allows the subscriber to transfer incoming calls to either his caller identification, a telephone number, or some other number of choice. FIG. 4L is the Follow Me Menu which allows the subscriber to receive calls wherever he may be located. FIG. 4M shows the Notification Menu which allows the subscriber to be notified either by pager or e-mail in certain situations. FIG. 4N shows the Telephone Numbers Menu which allows the subscriber to dial a telephone number either by depressing the telephone keypad or speaking the number.

FIG. 4O shows the Record a New Greeting Menu which allows the subscriber to record, listen, or re-record a greeting which a caller will hear upon reaching the subscriber. FIG. 4P shows the Name Recording Menu which allows the subscriber to set a particular name in the system. FIG. 4Q shows the Personal Options Menu which allows the subscriber to change the security code, the name recording, and the personal greeting. FIG. 4R shows the Set Security Code Menu which allows the subscriber to set a new security code.

Figure 5A:
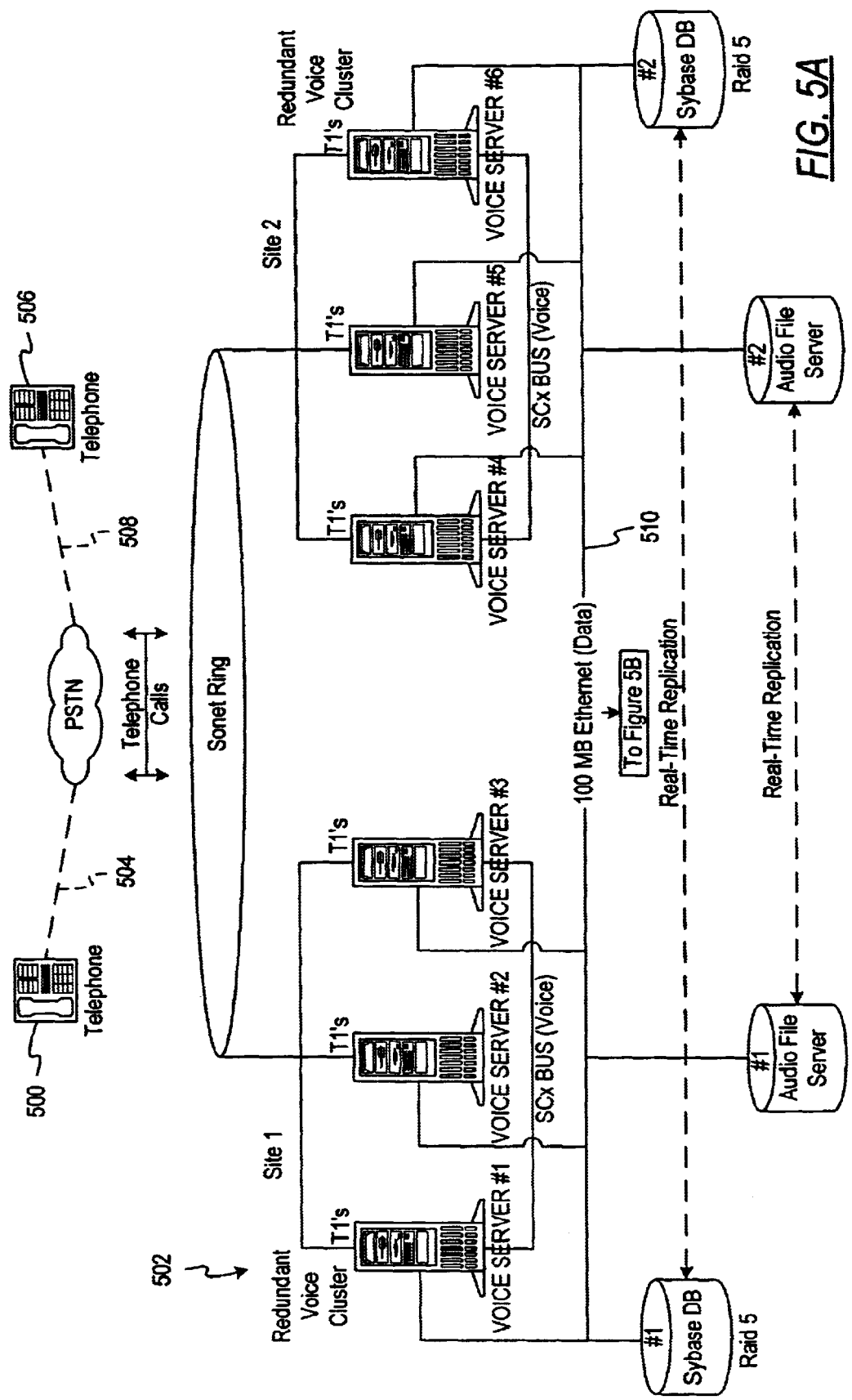
FIGS. 5A–5B are the functional block diagrams for the computer telephony platform and network architecture embodying the present invention.
Figure 5B:
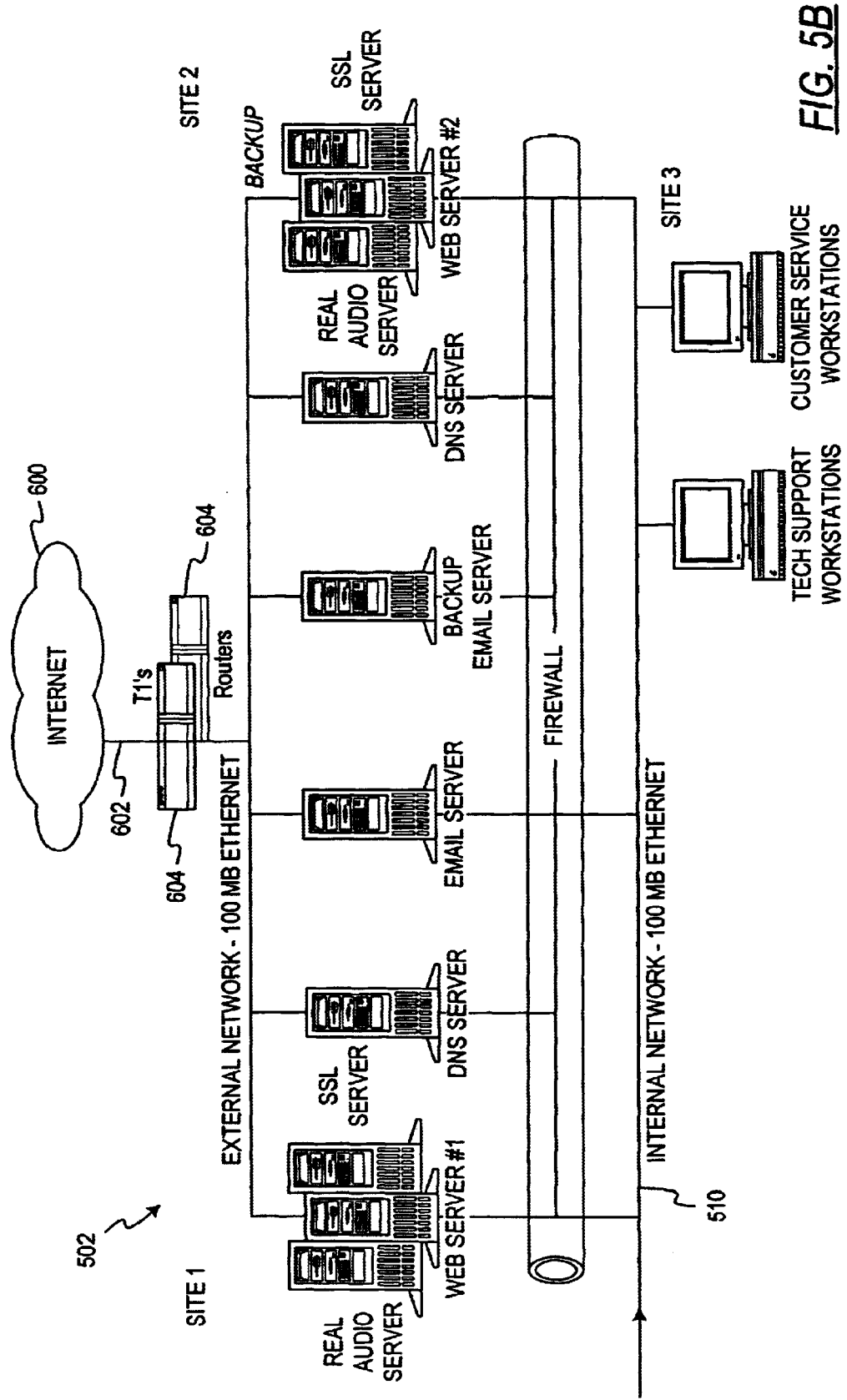
Figure 6:
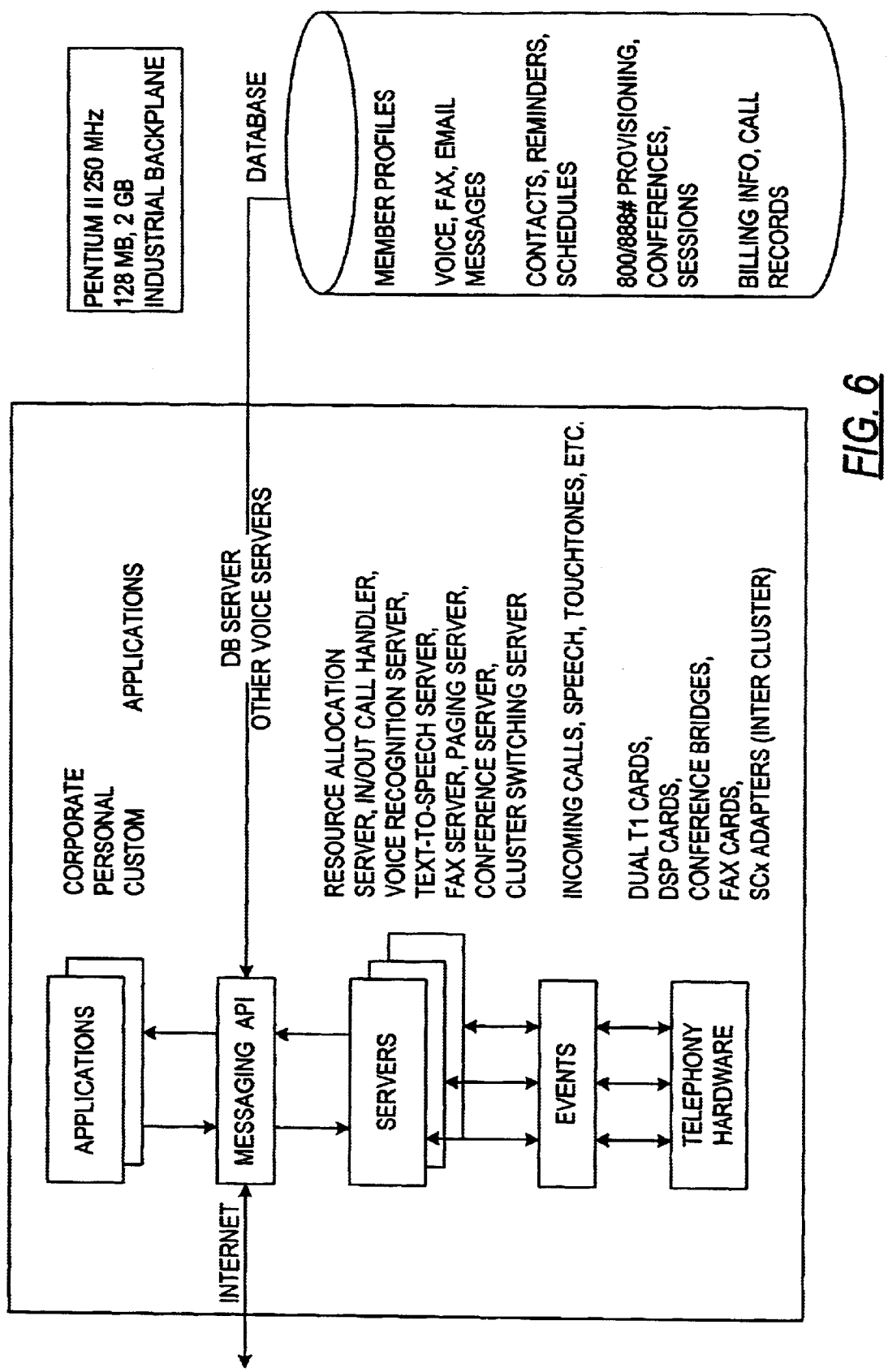
FIG. 6 is the software architecture embodying the present invention.

FIG. 5A shows the computer telephony platform in accordance with FIG. 1 in more detail. FIG. 5B shows the network architecture in accordance with FIG. 2 in more detail. FIG. 6 shows the software architecture utilized in the present invention.

FIGS. 5A and 5B depict how the unified network system can be used to transmit an receive messages between subscribers and other callers using both telephone connections and internet connections. Turning to FIG. 5A, telephone 500 is a subscriber communication device through which a subscriber can access the unified network system 502. The subscriber can access the unified network system 502 using the telephone 500 via a first telephone connection 504. This telephone connection 504 uses the Public Switched Telephone Network (PSTN) to access one of the redundant sites of the unified network system 502. Additional callers may also access the unified network system 502 in a similar manner. These additional callers may be other subscribers or non-subscribers. The caller may use telephone 506 in FIG. 5A in an attempt to contact a subscriber. The caller would be connected to the unified network system over a second telephone connection 508 using the PSTN.

Users of the unified network system 502 can also transmit and receive messages via internet connections. FIG. 5B depicts how the unified network system 502 can be connected to the Internet 600. In the embodiment depicted in FIG. 5B, several T1 communication lines 602 are coupled with routers 604 to provide a plurality of internet connections between the system 502 and subscribers and non-subscribers. These users are able to connect to the unified network system 502 via a connection between a data device, such as personal computer, and the Internet 600. Through T1 lines 602 and routers 604, user can then access the unified network system 502 to transmit and receive messages to other users. FIG. 2 also depicts how the internet browser 21 of a customer's computer is connected via an internet connection 23 to the web servers 16 which are a part of the unified network system 502.

Because the unified network system 502 of the present invention includes both telephone connections and internet connections, messages, including telephone calls, can be transmitted to or from subscribers of the system 502 using both connection types. In an embodiment of the present invention, a caller wishing to contact a subscriber may access the system 502 using either telephone connection 508 or an internet connection 23 (FIG. 2) established using a portion of one of the T1 lines 602 (FIG. 5B). Once the caller establishes a connection with the system 502, the system 502 presents the caller with the "First Menu" options outlined in FIG. 4A. One option presented to the caller is to speak the name of a subscriber that the caller is attempting to reach. If the system 502 recognizes the spoken name, control is then transferred to the "Party Menu" shown in FIG. 4B. At this point, the caller may choose to contact the party by speaking "reach my party" or the caller my choose to simply leave a message by speaking "leave a message." If the caller wishes to speak with the subscriber, the caller chooses the option "reach my party" and the system 502 will establish a connection with the subscriber using either the telephone connection 504 or an internet connection 23 (FIG. 2) (established using a portion of one of the T1 lines 602 (FIG. 5B)) according to the call routing instructions set up by the subscriber.

Alternatively, the caller may choose to simply "leave a message" for the subscriber. In this case, the caller is prompted to record a message as outline in FIG. 4G. After the message is recorded, the caller is presented with the options to listen to the message, send the message, cancel the message, or re-record the message as outlined in the "After Record Message Menu" depicted in FIG. 4H. Once the caller selects the option to "send the message", the message is delivered to the subscriber using either the telephone connection 504 or an internet connection 23 (FIG. 2) (established using a portion of one of the T1 lines 602 (FIG. 5B)) according to the notification settings set up by the subscriber (see, e.g., FIG. 4M).

The subscriber can also initiate the transmission of messages, including telephone calls to other subscribers or non-subscribers. As discussed above, the subscriber accesses the system 502 using either a telephone connection 504 or an internet connection 23 (FIG. 2). Once connected with the system 502, a subscriber can perform several functions. For example, a subscriber can choose to make calls to other users via the "Make a Call Menu" depicted in FIG. 4I. The system 504 would then establish a connection with another user using either the telephone connection 508 or via an internet connection internet connection 23 (FIG. 2) established using a portion of one of the T1 lines 602 (FIG. 5B).

The system provides three ways for the subscriber to handle his communications. First and foremost is the voice recognition software using natural voice recognition (phonemes based), not pattern based as many of the current systems utilize. Therefore, the system does not have to be trained to identify your voice. Second, the subscriber may use the standard telephone touchtones. And third, the subscriber can utilize the internet to access a secure web site.

The system can act as a "follow me" service, capable of tracking you down whether you're at home, the office, airport, in a hotel room, in another office or in your car. The subscriber can configure the system to follow him, or the subscriber can disengage the follow me with a simple command. It also lets you know who is calling before you accept the call.

As for Web connections, you can boot up your computer, sign onto the internet, go through the system's secure web site and play your voice mails, read your e-mail and faxes, manage your contacts and schedule conferences. The website thus becomes a unified-messaging system. If you get a message from somebody who's not in your address book and you want to call him or her, you just go to the web site again and add a contact.

If you're on the secure website and you walk away, the system even times out after a few minutes so no one can sit at your computer and obtain your messages and contacts without your permission.

While on the system's web site, you'll be communicating over the internet via the Secure Socket Layer (SSL), a transport level technology (developed by Netscape) for authentication and data encryption between a Web server and a Web browser. SSL sends data over a "socket," a secure channel at the connection layer existing in most TCP/IP applications.

The system also utilizes text-to-speech so you can listen to your e-mail over the phone, or the subscriber can display his e-mail on his computer where he can reply to it and send e-mail to his contacts with audio (using audio attachments). Further, using Vosaic's internet audio program, the system can deliver voice mail via streaming audio over the internet using Java without a plug-in.

During a session on the web site, using text-to-speech, you could type in a name like "Harry Newton" and his phone number so that, when you eventually use the system the phone and you say, "call Harry Newton at the office," the system will recognize the name and dial the number you keyed in previously. Based on what you input now ("Harry Newton") is what the system utters later and compares the phonemes of what you input now to what you'll be speaking later.

The system also facilitates conference calls by allowing the subscriber two ways in which to set up a conference call. First, inbound conference calls can be set up for 32 people if you've registered a pre-scheduled meeting time. Subscribers call in to the system to get an assigned conference number. The conference participants then call in and asks to "join the conference". The system then asks for a conference number, which is entered via touchtones. All the parties are then connected and the conference begins.

Second, outbound conference calls can also be set up, even if you're "on the fly." Whether you're at your desk, at a hotel or even a phone booth, you can simply dial up and tell the system to "set up a conference call." Then you only have to dial up all the various parties to connect each of them to your conference.

The present invention is a compilation of hardware and software, including voice processing using Dialogic's SCSA extended bus and board-level resources, Purespeech speech recognition running on Dialogic Antares boards, and database management using Sybase System 10 and 11. Further, the system utilizes data networking, particularly TCP/IP and distributed systems, object-oriented design and programming, multi-processing with Intel hardware, SCO UNIX and Solaris operation systems, Java and JavaScript languages, U.S. and international long distance protocols, internet and web protocols, credit and payment processing, a help desk, customer service system, and network and service management.

For the voice and fax processing servers, the system relies on Dialogic hardware, including, voice boards, Antares cards (for speech recognition and fax) and digital switching cards. The system also uses the SCSA extended bus. The Purespeech ASR algorithms, which are used for speech recognition, run on the Antares cards plugged into the computers running the Solaris OS.

The system combines state-of-the-art speech recognition, computer and telephony technology. Along with the ability to recognize an extensive set of simple, intuitive, speaker-independent speech commands and respond by performing a wide variety of complex tasks. Each subscriber has their own secure Web page on which all the features can be accessed, allowing almost every aspect of the present invention to be maintained on-line. Subscribers can use voice commands to (1) build, edit and manage their contact lists, (ii) review, play back, read, reply to and/or reroute voice mail and e-mail, (iii) schedule conference calls with 800 number access, and (iv) maintain an itemized calling log listing all calls with a running total of all charges.

The system also transfers calls as instructed or upon command will follow the subscriber according to predetermined contact numbers for office, home, cellular, pager or other designated locations. Every time a subscriber calls in, the system logs the originating number for the inbound call and then uses that number to re-contact the subscriber.

In accordance with the present invention, every subscriber or participant is given their own 800 number that is then used by all contacts calling in to the subscriber. The 800 number can also be used in scheduling conference calls for up to 32 participants on a given day and time. Each participant uses the 800 number and calls in to join the conference call, thereby effecting call conferencing for a fraction of the cost otherwise incurred.

Basically, the system provides a unified solution to the many varied communications and messaging devices used daily by mobile professionals and active consumers. With simple voice commands, subscribers can easily access and respond to all of their communications and messaging media in the same session.

The system takes inbound calls and contacts the subscriber, using call transfer or follow me features, and advises the subscriber of the call, the number of the calling party and/or the callers identity from the subscribers contact list. If the subscriber is on the telephone, the system will whisper the pending call information, giving the subscriber the option of taking the call or sending the caller into voice mail. The subscriber can also set priorities for certain calls which the system will follow, permitting selected calls to be put on call waiting, transferred or directed through call forwarding, while other calls are direct to voice mail messaging. Subscribers can conveniently make calls from their contact list by voice commands giving the contacts name and, if applicable, the location to be called (i.e. "home," "office," "cellular," etc.)

Subscribers can access and play back their voice mail from any telephone or from their personal Web page. Voice mail messages can be saved, retrieved, deleted or rerouted to other individuals, groups or broadcast and voice responses can be returned immediately to the caller. Also, e-mail messages can be viewed on the subscriber's personal home page or the system will read the e-mail to the subscriber from any telephone using text-to-speech technology. Subscribers can immediately respond to e-mail with voice messages, marking, saving or deleting messages during the same session. E-mail messages can also be sent to any fax machine. Further, subscribers can immediately respond to faxes rather than waiting to retrieve copies and delay responses. Incoming faxes are received, the subscriber is notified of the arrival of the new fax, the fax can then be stored for later viewing and/or redirected to any fax machine or e-mail address from the subscribers contact list or any other number. Subscribers can also be notified of any incoming communications and messages by pager, whether an inbound call, voice mail, e-mail or fax.

The system will automate conference calling and eliminate the need for conference call operators or complex, confusing PBX systems. The subscriber remains in control and can add or drop callers, mute the call and otherwise control all aspects of the conference call. By pre-scheduling conference calls by date and time, subscribers can notify participants, giving them an 800 number to call and join the conference. Up to 32 participants can be included in the present conference call feature.

The system further acts as an efficient secretary retaining complete contact logs of all call statistics. The subscriber maintains the contact list using simple voice or keyboard commands and can establish contact groups for broadcast communications and setting up conference calls. The contact database is easily accessible to all features.

The system includes a feature which enables subscribers to retrieve on demand or at predetermined intervals selected information from the internet or on-line service providers, allowing subscribers to establish "filter and forward" criteria specifying the type of information desired. A search engine will then retrieve the requested information, transmit the information to the system platform and notify the subscriber by page, telephone or other desired means. The system will provide direct access to news, weather, sports, financial, travel and other custom content directly from a computer or any telephone. The subscriber will then access the information by all available options, including text-to-speech capabilities.

The system provides long distance and international calling over the internet through the subscriber's personal home page, thereby significantly reducing the costs of long distance and international calling. The system further provides video conferencing features.

It is to be understood that the form of this invention is merely a preferred embodiment. Various changes may be made in the function and arrangement of parts; equivalent means may be substituted for those illustrated and described; and certain features may be used independently from others without departing from the spirit and scope of the invention as defined in the following claims.

What is claimed is:

1. A computer and telecommunications network for receiving, sending and managing information from a subscriber through a subscriber communication device to the network and from the network to the subscriber communication device, comprising:

at least one cluster, said cluster containing at least one voice server, said voice server containing telephony and speaker-independent speech command recognition and execution functions, such that said subscriber can access said cluster via a first standard telephone connection and also via a first internet connection;

at least one database server, said database server being connected to said cluster and containing contact lists, and administrative data, such that said subscriber can manipulate and manage said data and said contact lists;

at least one file server, said file server being connected to said cluster; and a web server, said web server being connected to said cluster such that said subscriber can access said network by connecting to said web server via said first internet connection;

wherein said network can receive a first message from a second telephone connection and from a second internet connection and transmit said first message to said subscriber communication device or transmit a notification to said subscriber communication device about said first message via said first telephone connection or said first internet connection, and said network can receive a second message from said subscriber communication device via said first telephone connection and via said first internet connection and transmit said second message via said second telephone connection or said second internet connection based on commands received from said subscriber.

2. The computer and telecommunications network described in claim 1, wherein said first message and said second message comprises telephone calls, e-mail, faxes, conference calls or voice-mail.

3. The computer and telecommunications network described in claim 1, wherein manipulating and managing said data and said contact lists comprises creating and modifying a contact list.

4. The computer and telecommunications network described in claim 3, wherein manipulating and managing said data and said contact lists comprises utilizing said contact lists to place telephone calls, send e-mail, voice-mail and faxes, and create or modify conference calls.

5. A method for receiving, sending and managing information between a computer and telecommunications network and a subscriber communication device of a subscriber comprising the steps of:

providing at least one cluster, said cluster containing at least one voice server, said voice server containing telephony and speaker-independent speech command recognition and execution functions, such that said subscriber can access said cluster via a first standard telephone connection and also via a first internet connection;

providing at least one database server, said database server being connected to said cluster and containing contact lists, and administrative data, such that said subscriber can manipulate and manage said data and said contact lists;

providing at least one file server, said file server being connected to said cluster; and providing a web server, said web server being connected to said cluster such that said subscriber can access said network by connecting to said web server via said first internet connection;

receiving a first message from a second telephone connection and receiving a second message from a second internet connection and transmitting said first message and said second message to said subscriber communication device or transmitting a notification to said subscriber communication device about said first message and said second message via said first telephone connection or said first internet connection, based on commands received by the network from said subscriber.

6. The computer and telecommunications network described in claim 5, wherein said message comprises telephone calls, e-mail, faxes, conference calls or voice-mail.

7. The computer and telecommunications network described in claim 5, wherein manipulating and managing said data and said contact lists comprises creating and modifying a contact list.

8. The computer and telecommunications network described in claim 7, wherein manipulating and managing said data and said contact lists comprises utilizing said contact list to place telephone calls, send e-mail, voice-mail and faxes, and create or modify conference calls.

9. A method for receiving, sending and managing information between a computer and telecommunications network and a subscriber communication device of a subscriber comprising the steps of:

providing at least one cluster, said cluster containing at least one voice server, said voice server containing telephony and speaker-independent speech command recognition and execution functions, such that said subscriber can access said cluster via a first standard telephone connection and also via a first internet connection;

providing at least one database server, said database server being connected to said cluster and containing contact lists, and administrative data, such that said subscriber can manipulate and manage said data and said contact lists;

providing at least one file server, said file server being connected to said cluster, and providing a web server, said web server being connected to said cluster such that said subscriber can access said network by connecting to said web server via said first internet connection;

receiving a first message from said subscriber via said first telephone connection;

receiving a second message from said subscriber via said first internet connection; and transmitting said first message and said second message via a second telephone connection or a second internet connection, based on commands received by said network from said subscriber.

10. The computer and telecommunications network described in claim 9, wherein said message comprises telephone calls, e-mail, faxes, conference calls or voice-mail.

11. The computer and telecommunications network described in claim 9, wherein manipulating and managing said data and said contact lists comprises creating and modifying a contact list.

12. The computer and telecommunications network described in claim 11, wherein manipulating and managing said data and said contact lists comprises utilizing said contact list to place telephone calls, send e-mail, voice-mail and faxes, and create or modify conference calls.

13. The computer and telecommunications network of claim 1, wherein said subscriber may issue commands to manipulate and manage said contact lists and administrative data.

14. The computer and telecommunications network of claim 13 wherein said commands are speech commands which are interpreted by said speaker-independent speech command recognition of said at least one voice server.

15. The computer and telecommunications network of claim 1, wherein said commands received from said subscriber are speech commands which are interpreted by said speaker-independent speech command recognition of said at least one voice server.

16. The computer and telecommunications network of claim 15 wherein said speech commands are utilized to place telephone calls, create and send e-mail, voice-mail and faxes, and to create or modify conference calls.

17. The computer and telecommunications network of claim 1 wherein said speaker-independent speech command recognition of said at least one voice server recognizes naturally spoken speech commands.

18. The method of claim 5, comprising the additional step of issuing commands from said subscriber for manipulating and managing said contact lists and administrative data.

19. The method of claim 18 wherein said step of issuing commands comprises issuing speech commands spoken by said subscriber.

20. The method of claim 5, wherein said commands received by said network from said subscriber are speech commands; and interpreting said speech commands by said speaker-independent speech command recognition of said at least one voice server.

21. The method of claim 20 further comprising the steps of placing telephone calls, creating and sending e-mail, voice-mail and faxes, and creating and modifying conference calls based upon said speech commands.

22. The method of claim 5 comprising the further step of recognizing naturally spoken speech commands using said speaker-independent speech command recognition.

23. The method for of claim 9, wherein said commands received by said network from said subscriber are speech commands; and interpreting said speech commands by said speaker-independent speech command recognition of said at least one voice server.

24. The method of claim 23 further comprising the steps of placing telephone calls, creating and sending e-mail, voice-mail and faxes, and creating and modifying conference calls based upon said speech commands.

25. The method of claim 9 comprising the further step of recognizing naturally spoken speech commands using said speaker-independent speech command recognition.

26. The computer and telecommunications network of claim 1 wherein said subscriber communication device comprises a cellular phone, a pager, a personal computer, a fax machine, an electronic mailbox or a voice-mail service.

27. The method of claim 5 wherein said subscriber communication device comprises a cellular phone, a pager, a personal computer, a fax machine, an electronic mailbox or a voice-mail service.

28. The method of claim 9 wherein said subscriber communication device comprises a cellular phone, a pager, a personal computer, a fax machine, an electronic mailbox or a voice-mail service.

* * * * *

UNITED STATES PATENT AND TRADEMARK OFFICE
CERTIFICATE OF CORRECTION

PATENT NO.    : 6,775,264 B1
DATED         : August 10, 2004
INVENTOR(S)   : Alex Kurganov Page 1 of 1

It is certified that error appears in the above-identified patent and that said Letters Patent is hereby corrected as shown below:

Title page,
Item [56], References Cited, U.S. PATENT DOCUMENTS, delete "5,404,234" and replace with -- 5,404,231 --;
Delete "4,809,328" and replace with -- 4,809,321 --; and
Add reference -- 5,029,196 --.

Column 14,
Add claims 29, 30, and 31,
-- 29. The voice server of claim 1 further comprising at least one of text-to-speech, speech-to-text, or telephone conferencing functions.
   30. The voice server of claim 5 further comprising at least one of text-to-speech, speech-to-text, or telephone conferencing functions.
   31. The voice server of claim 9 further comprising at least one of text-to-speech, speech-to-text, or telephone conferencing functions. --

Signed and Sealed this

Twelfth Day of October, 2004

JON W. DUDAS
*Director of the United States Patent and Trademark Office*